US012781560B2

(12) United States Patent
Peng et al.

(10) Patent No.: US 12,781,560 B2
(45) Date of Patent: Nov. 3, 2026

(54) DOOR OPENING AND CLOSING DEVICE AND ELECTRICAL APPARATUS

(71) Applicants: HEFEI MIDEA REFRIGERATOR CO., LTD., Hefei (CN); HEFEI HUALING CO., LTD., Hefei (CN); MIDEA GROUP CO., LTD., Foshan (CN)

(72) Inventors: Bo Peng, Hefei (CN); Zhuohua Jiang, Hefei (CN); Yerui Feng, Hefei (CN); Shuo Yang, Hefei (CN); Bing Shi, Hefei (CN); Jinguo Yuan, Hefei (CN); Yafei Zhu, Hefei (CN); Xiuliang Fu, Hefei (CN)

(73) Assignees: HEFEI MIDEA REFRIGERATOR CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 175 days.

(21) Appl. No.: 18/856,596

(22) PCT Filed: Jun. 28, 2022

(86) PCT No.: PCT/CN2022/101709
§ 371 (c)(1),
(2) Date: Oct. 11, 2024

(87) PCT Pub. No.: WO2023/151221
PCT Pub. Date: Aug. 17, 2023

(65) Prior Publication Data

US 2025/0250842 A1 Aug. 7, 2025

(30) Foreign Application Priority Data

Feb. 14, 2022 (CN) ........................ 202210151156.4

(51) Int. Cl.
*E05F 15/614* (2015.01)
*E05F 15/63* (2015.01)
*F25D 23/02* (2006.01)

(52) U.S. Cl.
CPC ......... *E05F 15/63* (2015.01); *E05Y 2201/216* (2013.01); *E05Y 2201/264* (2013.01);
(Continued)

(58) Field of Classification Search
CPC ........ F25D 23/028; E05F 15/00; E05F 15/63; E05F 15/70; E05F 15/614; E05Y 2900/30;
(Continued)

(56) References Cited

U.S. PATENT DOCUMENTS 4,367,610 A * 1/1983 Goode .................... E05F 15/53 49/340
4,367,632 A * 1/1983 Ibrahim ................ F25D 23/028 62/282
(Continued)

FOREIGN PATENT DOCUMENTS

CN 208332837 U 1/2019
CN 109629948 A 4/2019
(Continued)

OTHER PUBLICATIONS

The First Notification of Examination Opinion received in the counterpart CN application 2022101340927, mailed on Apr. 9, 2025, 15 pages with English translation.
(Continued)

*Primary Examiner* — James O Hansen
(74) *Attorney, Agent, or Firm* — K&L Gates LLP

(57) ABSTRACT

The disclosure discloses a door opening and closing device and an electrical apparatus, and belongs to the field of electrical apparatus. The door opening and closing device
(Continued)

includes: a door ejection mechanism and a door rotation mechanism which are driven by a same drive mechanism. The drive mechanism includes: a driver, a first transmission assembly, a second transmission assembly connected to the driver and simultaneously separably connected to the first transmission assembly, and a clutch-ejection-push assembly, including an ejection-push sleeve which is sleeved on the second transmission assembly and a push rod for pushing the ejection-push sleeve, and the ejection-push sleeve is ejected and pushed by the push rod to push the second transmission assembly to separate from or connect to the first transmission assembly; and a linkage gear connected to the first transmission assembly and simultaneously connected to the door ejection mechanism and the door rotation mechanism.

18 Claims, 20 Drawing Sheets

(52) U.S. Cl.
CPC ... *E05Y 2201/712* (2013.01); *E05Y 2201/716* (2013.01); *E05Y 2900/31* (2013.01); *F25D 23/028* (2013.01)

(58) Field of Classification Search
CPC ........... E05Y 2900/31; E05Y 2900/304; E05Y 2201/216; E05Y 2201/264; E05Y 2201/712; E05Y 2201/716
USPC .......................................................... 312/405
See application file for complete search history.

(56) References Cited

U.S. PATENT DOCUMENTS 5,988,709 A * 11/1999 Lee ..................... E05B 65/0042 292/199
6,338,536 B1 * 1/2002 Ueno .................. E05B 17/0033 49/478.1
10,301,865 B2 * 5/2019 Son ....................... E05F 15/614
10,961,762 B1 * 3/2021 Botu ..................... F25D 23/028
2006/0038412 A1 * 2/2006 Muramatsu ........... E05F 1/1215 292/144
2017/0260794 A1 * 9/2017 Son ....................... E05F 15/614
2019/0301228 A1 * 10/2019 Yao ....................... E05F 15/619

FOREIGN PATENT DOCUMENTS

CN 109695396 A 4/2019
CN 111503981 A 8/2020
CN 111721057 A 9/2020
CN 215216805 U 12/2021
CN 113958222 A 1/2022
CN 215571542 U 1/2022
WO 2018121562 A1 7/2018

OTHER PUBLICATIONS

The First Notification of Examination Opinion received in the counterpart CN application 2022101341192, mailed on Apr. 11, 2025, 21 pages with English translation.
The Second Notification of Examination Opinion received in the counterpart CN application 2022101341192, mailed on Aug. 4, 2025, 22 pages with English translation.
The First Notification of Examination Opinion received in the counterpart CN application 2022101353876, mailed on Apr. 11, 2025, 16 pages with English translation.
The First Notification of Examination Opinion received in the counterpart CN application 2022101354012, mailed on Apr. 10, 2025, 16 pages with English translation.
The First Notification of Examination Opinion received in the counterpart CN application 2022101355015, mailed on Apr. 11, 2025, 24 pages with English translation.
The First Notification of Examination Opinion received in the counterpart CN application 2022101511564, mailed on Apr. 11, 2025, 18 pages with English translation.
ISR Received in PCT/CN2022/101709; mailed Nov. 15, 2022.

* cited by examiner

DOOR OPENING AND CLOSING DEVICE AND ELECTRICAL APPARATUS

CROSS-REFERENCES TO RELATED APPLICATIONS

The present disclosure is a national phase application of International Application No. PCT/CN2022/101709, filed on Jun. 28, 2022, which claims priority to the Chinese patent application No. 202210151156.4, filed on Feb. 14, 2022, which is incorporated herein by reference in its entirety.

FIELD

The disclosure relates to the field of electrical technology, and particularly to a door opening and closing device and an electrical apparatus.

BACKGROUND

With an improvement of living standards, electrical apparatuses such as refrigerators, dishwashers, and disinfection cabinets have become widely used in lives of people. In order to maintain a sealing performance of the above electrical apparatuses, an adsorption structure is usually disposed between a box body and a door body of the electrical apparatuses, or a negative pressure is maintained inside relative to outside of the electrical apparatuses to stably fix the door body onto the box body. Although the electrical apparatuses have an improved sealing performance, a difficulty of opening a door body has also been increased to an extent. It usually requires a greater force to open the door body, which is inconvenient to use. Especially for the elderly, children, patients and so on, it is not only difficult to operate, but also has certain safety risks. After the door body is opened, as an adsorption force and negative pressure force disappear, a rotation speed of the door body will instantaneously increase, and the door body is prone to collide with an operator, or problems, such as objects stored within the box body falling down due to a vibration, are caused.

SUMMARY

A door opening and closing device and an electrical apparatus are provided according to the disclosure, aiming to achieve an effect of improving a convenience and safety of opening a door body of an electrical apparatus to an extent.

A door opening and closing device is provided according to one embodiment of the disclosure, including: a driver; a first transmission assembly; a second transmission assembly, connected to the driver and simultaneously separably connected to the first transmission assembly; a clutch-ejection-push assembly, comprising an ejection-push sleeve which is sleeved on the second transmission assembly, and a push rod for pushing the ejection-push sleeve, and the ejection-push sleeve is ejected and pushed by the push rod to push the second transmission assembly to separate from or connect to the first transmission assembly. a linkage gear, connected to the first transmission assembly and simultaneously connected to the door ejection mechanism and the door rotation mechanism.

An electrical apparatus is also provided according to another embodiment of the disclosure, including a box body, a door rotatably disposed on the box body, and the above door opening and closing device. The base is disposed on the box body.

ILLUSTRATION OF REFERENCE NUMERALS

100, drive mechanism; 110, driver; 120, linkage gear; 121, third tooth portion; 122, third ejection-push portion; 1221, second tooth portion; 123, rotation limit groove; 1231, first ejection-push portion; 1232, second ejection-push portion; 124, reset-spring accommodation groove; 125, second fix seat;

200, door rotation mechanism; 210, drive member; 211, coaxial rotation shaft; 212, first fix seat; 220, door rotation member; 230, hinge seat; 240, reset spring;

300, door ejection mechanism; 310, linkage member; 311, linkage-member pivot hole; 312, thickness reduction groove; 313, first tooth portion; 314, third fix seat; 320, door ejection member; 322, waist-shaped hole; 330, ejection-push seat; 340, shock-absorb pad; 350, linkage-member pivot shaft; 360, pin shaft; 370, elastic limit member; 380, door ejection profile; 381, fourth tooth portion; 382, door ejection portion; 383, reinforcement rib;

400, clutch device; 410, first transmission assembly; 411, slot; 412, central shaft hole; 413, internal teeth; 414, extension tube; 420, second transmission assembly; 421, first transmission member; 4211, connection end; 4212, ejection-push end; 4213, support flange; 4214, first-transmission-member inner surface; 4215, external teeth; 4216, limit boss; 4217, axial through groove; 422, second transmission member; 4221, second-transmission-member outer surface; 4222, block; 4223, transmission-shaft hole; 4224, first limit surface; 423, transmission shaft; 4231, second limit surface; 430, clutch-ejection-push assembly; 431, ejection-push sleeve; 4311, first ejection-push surface; 4312, first ejection-push groove; 4313, sinking platform; 432, push rod; 4321, second ejection-push surface; 4322, limit baffle; 4323, push arm; 4324, connection portion; 433, linear driver;

600, base; 610, drive-motor fix groove; 620, second stop member; 621, stop surface; 630, first stop member; 631, elastic-member accommodation groove; 632, guide groove; 633, linkage-member first stop surface; 634, linkage-member second stop surface; 635, fourth fix seat; 641, third stop member; 642, fourth stop member; 650, coaxial rotation-shaft seat;

910, box body; 920, door body.

DETAILED DESCRIPTION OF THE DISCLOSURE

The disclosure provides a door opening and closing device, to improve an efficiency and convenience of door opening and closing operations to an extent, and at the same time to an extent solve problems of large resistance in an initial stage and too fast rotation in a subsequent stage of manually opening the refrigerator door, and unsmooth door opening and closing process.

A door opening and closing device according to some embodiments of the disclosure is configured to be assembled on an electrical apparatus with a door body that is deflectable to be opened and closed. The door body is driven to be open and closed through an action of the door opening and closing device. The electrical apparatus may be refrigerators, disinfection cabinets, dishwashers and so on.

Figure 1:
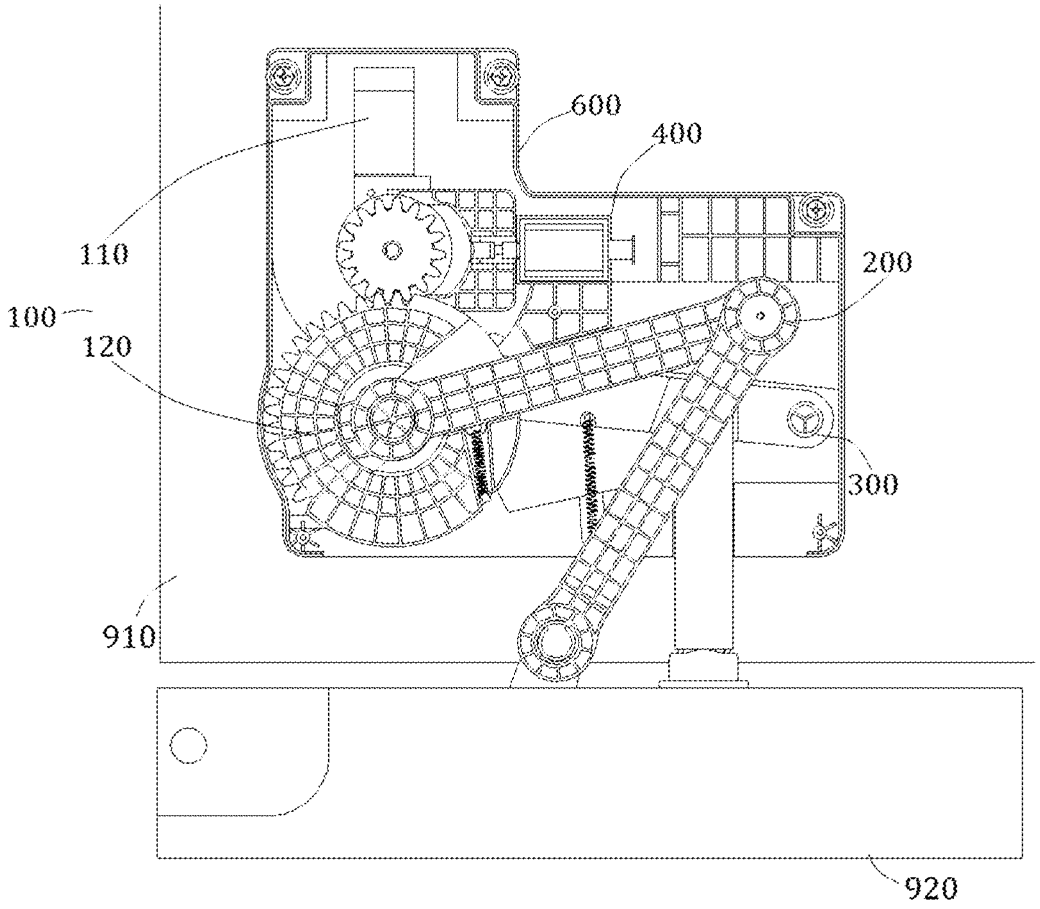
FIG. 1 shows a schematic structural diagram of a door opening and closing device according to one or more embodiments of the disclosure.

Referring to FIG. 1, in some embodiments, the electrical apparatus includes a box body 910 and a door body 920 which is rotatably disposed on the box body 910. An access opening is disposed on the box body 910. The door body 920 is operated to rotate on the box body 910 to close or open the access opening of the box body 910.

Referring to FIG. 1, in some embodiments, the door opening and closing device may include: a drive mechanism 100, a door rotation mechanism 200, and a door ejection mechanism 300. In some embodiments, the drive mechanism 100 outputs a driving force, which can drive the door rotation mechanism 200 and the door ejection mechanism 300 to implement a full rotation operation and an initial door ejection operation of the door body 920; that is, the door rotation mechanism 200 and the door ejection mechanism 300 according to the embodiments of the disclosure are both driven by the drive mechanism 100, and the driving forces for the door rotation mechanism 200 and the door ejection mechanism 300 are both provided by the drive mechanism 100. The drive mechanism 100 includes a driver 110 for providing power and a linkage gear 120 which is respectively connected to a door ejection mechanism 300 and the door rotation mechanism 200, and the driver 110 drives the door ejection mechanism 300 and the door rotation mechanism 200 to deflect relative to the base 600 through the linkage gear 120. The drive mechanism 100 is also provided with a clutch device 400, which is configured to be connected between the linkage gear 120 and the driver 110 to achieve a detachable connection, i.e., connect the linkage gear 120 to the driver 110 or disconnect the linkage gear 120 from the driver 110, to flexibly control a connection and disconnection of transmission paths between the driver 110 and the door ejection mechanism 300 as well as between the driver 110 and the door rotation mechanism 200. Therefore, the door ejection mechanism 300 and the door rotation mechanism 200 are avoided from interfering with the drive mechanism 100 during manual door opening and closing operations, and the drive mechanism 100 can be disconnected in an event of device failure or environmental interference, thereby ensuring a safety of structure and avoiding mechanical damage.

Figure 10:
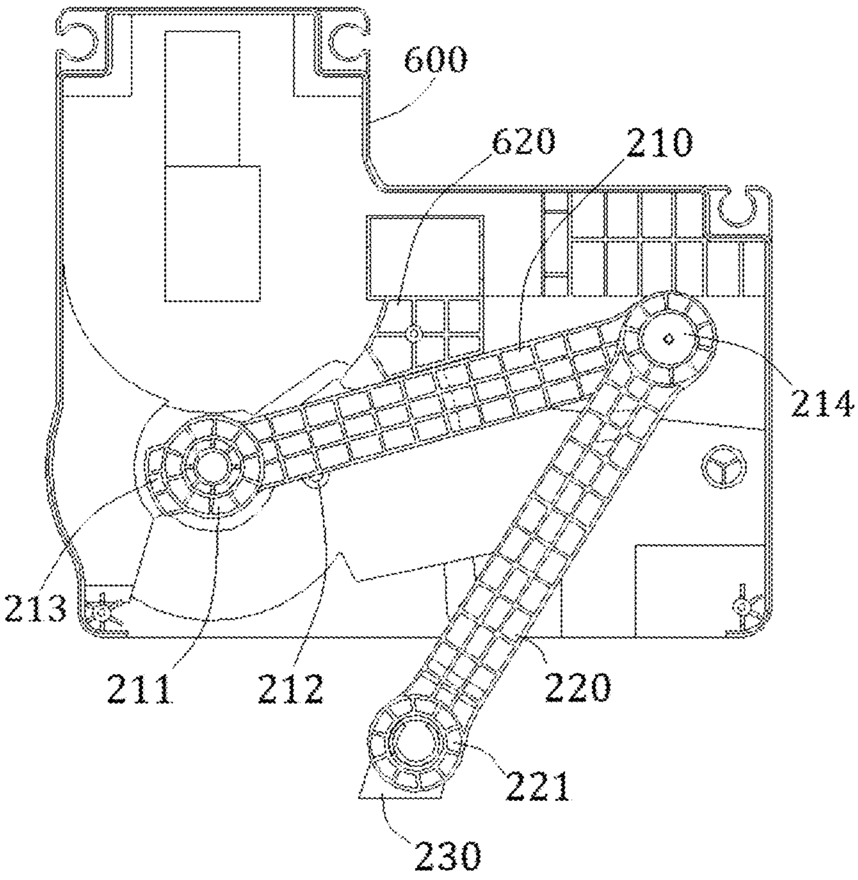
FIG. 10 is a schematic structural diagram of a door rotation mechanism of the door opening and closing device in FIG. 1.
Figure 12:
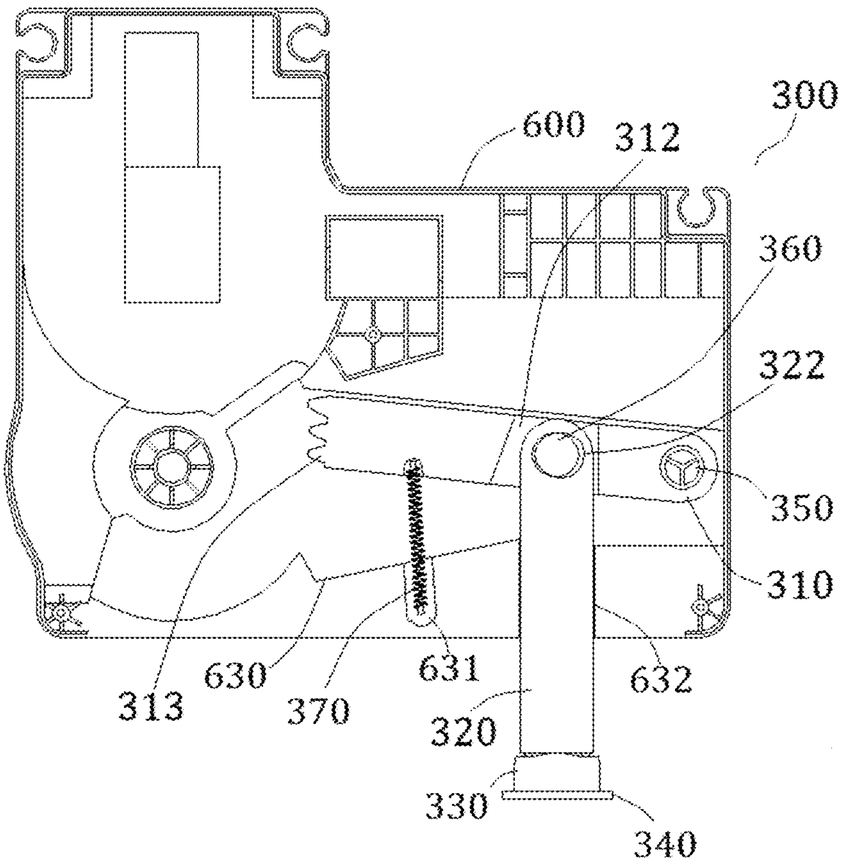
FIG. 12 is an schematic structural diagram of the door ejection mechanism of the door opening and closing device in FIG. 1.

Referring to FIG. 10 and FIG. 12, in some embodiments, the door rotation mechanism 200 or the door ejection mechanism 300 can be configured to respectively cooperate with the drive mechanism 100 to independently implement a door opening and closing structure solution or a door ejection structure solution. In some embodiments, the door ejection mechanism 300 cooperates with the drive mechanism 100 to break through door opening resistances such as an adsorption resistance, a negative pressure and so on between the door body 920 and the box body 910, to eject and open the door body 920 to a preset angle to facilitate subsequent automatic or manual door-opening operations. The door ejection mechanism 300 includes a linkage member 310 and a door ejection member 320 which is rotatably connected to the linkage member 310, and the linkage member 310 is rotatably disposed on the base 600. The door rotation mechanism 200 includes: a drive member 210 rotatably connected to the base 600 and a door rotation member 220 rotatably connected to the drive member 210, and the door rotation member 220 is also hinged to the door body 920; the linkage gear 120 is respectively connected to the drive member 210 and the linkage member 310.

Referring to FIG. 1, in some embodiments, in order to meet an assembly accuracy requirement or achieve an efficient assembly, a separate base 600 may be disposed on the box body 910 to carry the drive mechanism 100, the door rotation mechanism 200 and the door ejection mechanism 300, and the drive mechanism 100, the door rotation mechanism 200 and the door ejection mechanism 300 can be assembled on the base 600, and then the base 600 is assembled as a whole on the box body 910, to realize a standardized installation based on the base 600 on the electrical apparatus, thereby ensuring a placement stability while ensuring a matching accuracy and reliability. On the other hand, when the base 600 is assembled as a whole on electrical apparatus such as refrigerators, it is efficient and reliable due to that the base 600 can be installed as a whole.

In some embodiments, the base 600 is a separate component disposed in the box body 910. In other embodiments, the base 600 may also be a portion of the box body 910, and be formed on the box body 910, rather than a separate component.

In some embodiments, in a condition that an output power remains unchanged, an output force is inversely proportional to a speed. Therefore, in a condition that a driving power remains unchanged, a larger ejecting and pushing force can be obtained at a lower deflection speed for the door body in a door-ejecting stage, and the door ejection mechanism 300 can quickly and reliably eject and push the door body to open. When the door rotation mechanism 200 is put into use, since a rotational resistance is very small, a higher door-rotation speed can be obtained in a condition that a smaller door-rotation force can be maintained, thereby quickly completing a door-rotation operation and achieving door-opening in place.

A structure of the clutch device 400 is described in detail below.

Referring to FIGS. 2, 3, 4 and 5, the clutch device 400 according embodiments of the disclosure includes a first transmission assembly 410 and a second transmission assembly 420, which are connectable and separable, and are configured to respectively connect an upstream structure and a downstream structure to achieve stable and reliable connection and separation of the upstream structure and the downstream structure. Therefore, the clutch device 400 can be configured to realize a connection and separation for an upstream drive mechanism 100 in the door opening and closing device with a downstream door rotation mechanism 200 and the door ejection mechanism 300.

In order to switch the connection and separation states of the first transmission assembly 410 and the second transmission assembly 420, the clutch device 400 is further provided with a clutch-ejection-push assembly 430 for pushing the first transmission assembly 410 and the second transmission assembly 420 toward each other for connection or away from each other for separation. Engagement structures may be disposed on the first transmission assembly 410 and the second transmission assembly 420 respectively, to achieve stable connection and convenient separation of the first transmission assembly 410 and the second transmission assembly 420.

In some embodiments, the clutch-ejection-push assembly 430 is provided with an ejection-push sleeve 431 which can be sleeved on the second transmission assembly 420. During assembly, the second transmission assembly 420 is embedded in the ejection-push sleeve 431, and the second transmission component 420 is stably fixed by the ejection-push sleeve 431, and at the same time, can be indirectly pushed to move by pushing the ejection-push sleeve 431, thereby avoiding direct contact with the second transmission component 420, thereby avoiding affecting an operating state of the second transmission component 420. A structural stability of the second transmission assembly 420 can also be ensured by pushing the second transmission component 420 as a whole.

The clutch-ejection-push assembly 430 is also provided with a push rod 432 for pushing the ejection-push sleeve 431. The ejection-push sleeve 431 is pushed by the push rod 432 along a first direction, to push the second transmission assembly 420 to be closer to the first transmission assembly 410 to be connected with each other; or the push rod 432 is operated to make the ejection-push sleeve 431 to move in a direction opposite to the first direction, and the second transmission assembly 420 is away from the first transmission assembly 410 to be disconnected.

Figure 2:
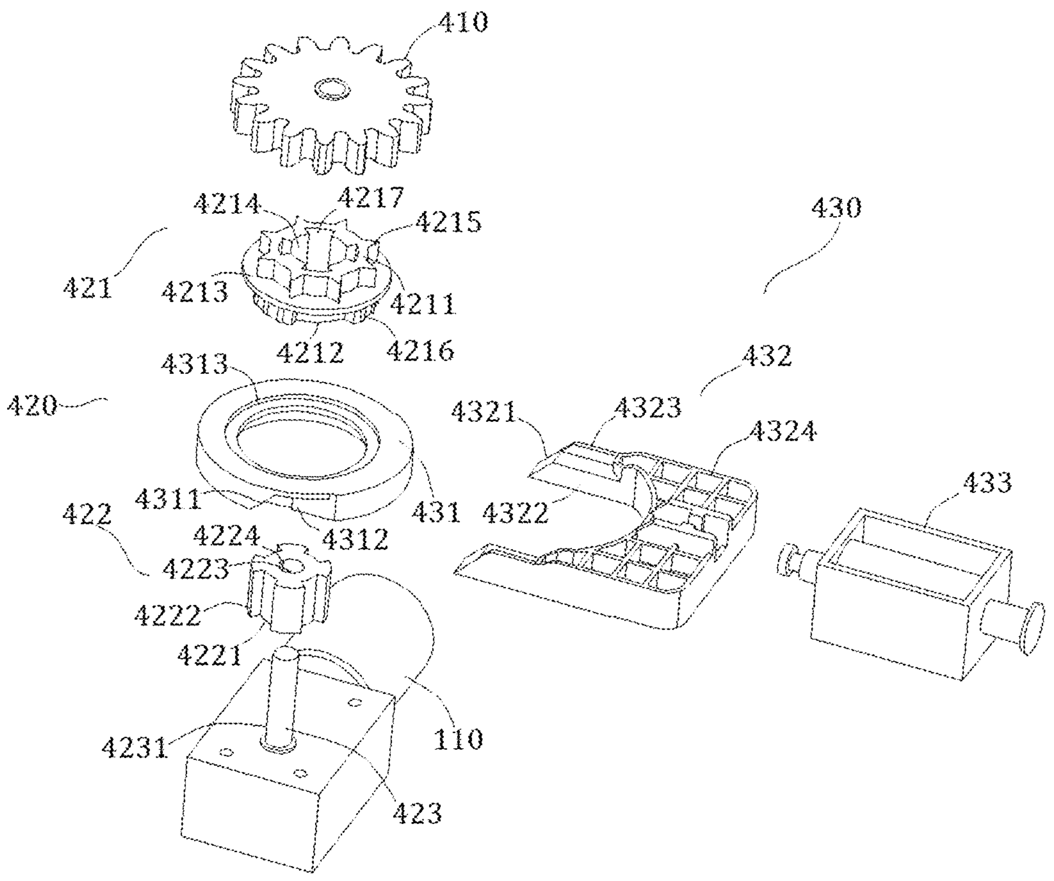
FIG. 2 is an exploded view of a clutch device of the door opening and closing device in FIG. 1.
Figure 3:
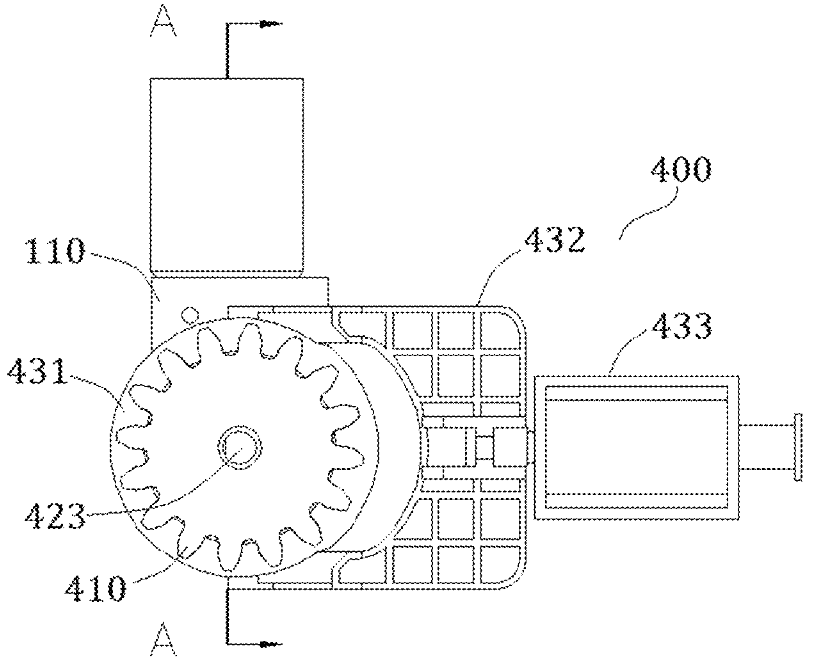
FIG. 3 is a top view of the clutch device in an assembly state of the door opening and closing device in FIG. 1.
Figure 4:
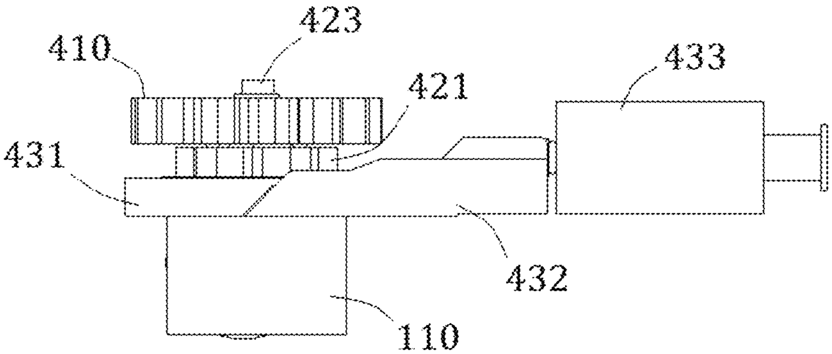
FIG. 4 is a front view of the clutch device in the assembly state of the door opening and closing device in FIG. 1.
Figure 5:
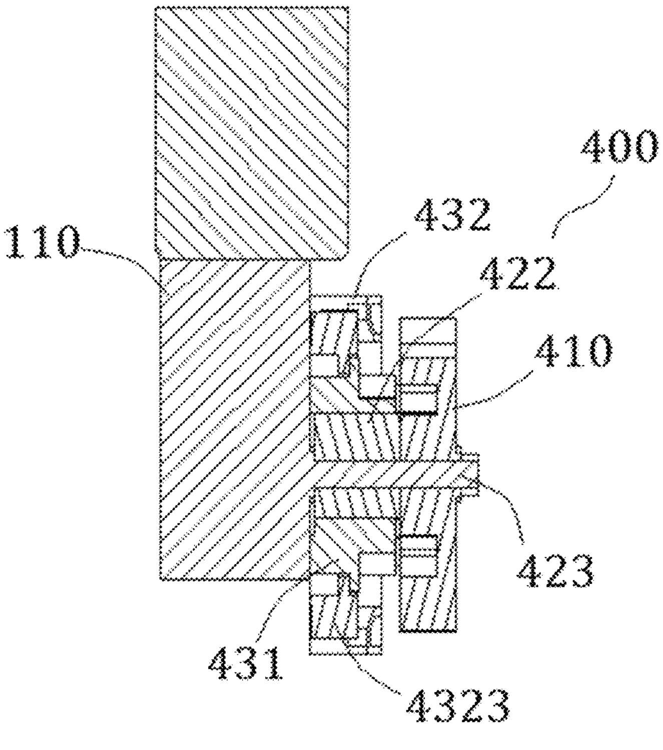
FIG. 5 is a cross-sectional view taken along line A-A in FIG. 3.
Figure 6:
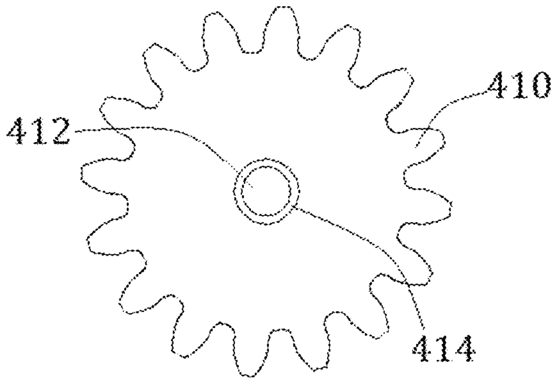
FIG. 6 is a top view of a first transmission assembly of the door opening and closing device in FIG. 1.
Figure 7:
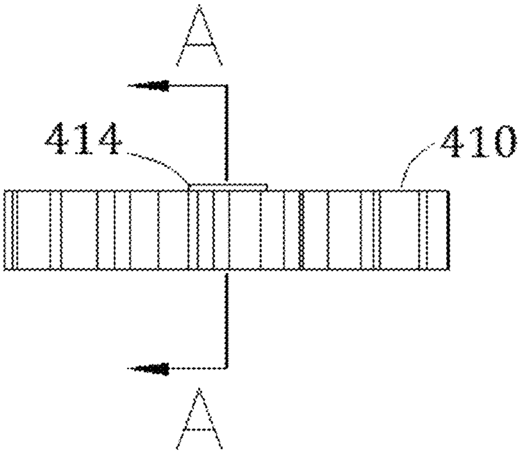
FIG. 7 is a front view of the first transmission assembly of the door opening and closing device in FIG. 1.
Figure 8:
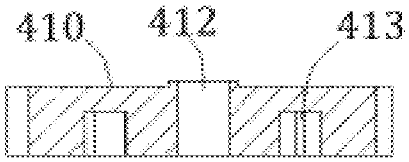
FIG. 8 is a cross-sectional view taken along line A-A in FIG. 7.
Figure 9:
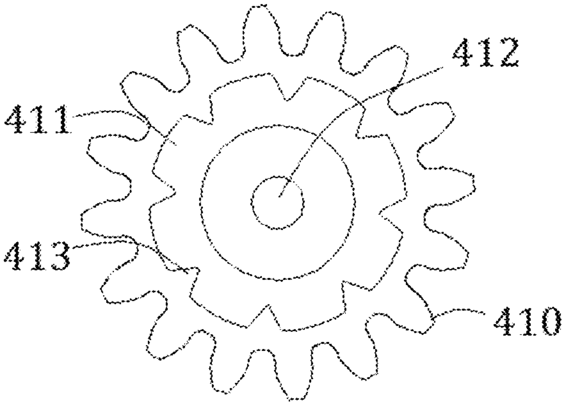
FIG. 9 is a bottom view of the first transmission assembly of the door opening and closing device in FIG. 1.

Referring to FIGS. 2 and 5, in some embodiments, the second transmission assembly 420 is provided with a first transmission member 421 which can be transmission-connected to the first transmission assembly 410. A connection end 4211 may be disposed on the first transmission member 421 for connecting to the first transmission assembly 410. An ejection-push end 4212 may also be disposed on the first transmission member 421 for being embedded in the ejection-push sleeve 431, thereby forming a stable fixed structure. Accordingly, the connection end 4211 may protrude from the ejection-push sleeve 431, ensuring that the connection end 4211 is smoothly connected to the first transmission assembly 410.

Referring to FIGS. 6, 7, 8 and 9, in some embodiments, in order to improve a smoothness and convenience of connection and separation of the first transmission assembly 410 and the connection end 4211, a slot 411 that can accommodate the connection end 4211 can be opened on the first transmission assembly 410, and a shape of the slot 411 can be set as a structural shape for snapping with the connection end 4211, and a stable connection state for transmission can be established through one-way ejection-push operations and a convenient engaging process, thereby ensuring a reliability of the transmission state. At the same time, when the first transmission assembly 410 and the second transmission assembly 420 is disconnected, a separation can also be quickly and smoothly achieved through a convenient one-way push away, and an impact on an operating state and structural stability of the first transmission member 421 and the first transmission assembly 410 can also be reduced.

In some embodiments, based on snapping and separation operations are implemented by way of approaching and moving away, internal teeth 413 may be disposed on a groove wall surface of the slot 411, and correspondingly, external teeth 4215 may be disposed on an outer peripheral surface of the connection end 4211. As the first transmission member 421 moves, the internal teeth 413 and the external teeth 4215 can be engaged and disengaged.

In some embodiments, in order to adapt to meshing requirements of the first transmission member 421 in a rotating state under certain working conditions, a gap between two adjacent internal teeth 413 in the slot 411 may be configured to be larger than a width of the external teeth 4215, and there is a sufficiently large space to facilitate the external teeth 4215 to be engaged in place and to efficiently establish a meshing connection state.

In some embodiments, the gap between two adjacent internal teeth 413 may be set to be more than twice the width of the external teeth 4215.

In some embodiments, a gap between two adjacent external teeth 4215 on the outer peripheral surface of the connection end 4211 may also be set to be larger than the width of the internal teeth 413, and there is a sufficiently large space to facilitate the internal teeth 413 to be engaged in place and to efficiently establish a meshing connection state.

In some embodiments, a gap between two adjacent external teeth 4215 may be set to be more than twice a width of the internal teeth 413.

In some embodiments, the first transmission assembly 410 can establish a transmission relationship with other structures by means of meshing transmission. The first transmission assembly 410 may be set as a first transmission gear. Accordingly, the slot 411 may be opened at an axial end of the first transmission gear. The first transmission member 421 moves along an axial direction of the first transmission gear to achieve connection and separation.

In some embodiments, in order to adapt to a rotating working state of the first transmission gear, the slot 411 may be configured as a circular slot, and the internal teeth 413 may be disposed on a wall surface of the circular slot at an equal interval, and the number of the internal teeth 413 is at least two. The number of internal teeth 413 may be set as six or eight, and a specific number of internal teeth 413 may be set according to a specification of the slot 411. Correspondingly, an outer surface of the connection end 4211 may also be configured to be circular, and the external teeth 4215 may be disposed on a circular groove wall surface at an equal interval, and the number of the external teeth 4215 may be set as at least two. The number of the external teeth 4215 may also be set to be six or eight. The specific number of the external teeth 4215 may be the same as the number of internal teeth 413.

A central shaft hole 412 of the first transmission gear is coaxially disposed with circular slot 411 to ensure a meshing efficiency and stability of the internal teeth 413. An extension tube 414 may be coaxially disposed at an orifice of the central axis hole 412 to facilitate an embedded rotation shaft to be stably fixed to the base 600.

In some embodiments, since the ejection-push end 4212 is embedded in the ejection-push sleeve 431, when the first transmission member 421 rotates, an unstable rotation posture and a situation of excessive wear can be easily caused due to a too large contact surface of the ejection-push end 4212 and the ejection-push sleeve 431. Spaced limit bosses 4216 may be disposed on an outer peripheral surface of the ejection-push end 4212 to separate an inner surface of the ejection-push sleeve 431 and an outer peripheral surface of the ejection-push end 4212, to leave a uniform gap between the ejection-push sleeve 431 and the ejection-push end 4212, thereby greatly reducing the contact area of the ejection-push sleeve 431 and the ejection-push end 4212, reducing a degree of wear of the ejection-push sleeve 431 and the ejection-push end 4212, and ensuring a stability of a rotation posture of the first transmission member 421.

In some embodiments, the limit boss 4216 slidably abuts against the inner surface of the ejection-push sleeve 431, thereby further reducing the degree of wear. A self-lubricating material layer may be disposed on the limit boss 4216 to reduce a friction coefficient, improve a wear resistance, and extend a service life.

In some embodiments, protrusions arranged at an interval may be further disposed on the outer peripheral surface of the limit boss 4216 to further reduce the contact surface.

In some embodiments, in order to achieve stable pushing of the first transmission member 421, a support flange 4213 may be further disposed on the first transmission member 421 for resting on an end surface of the ejection-push sleeve 431. The support flange 4213 may be disposed between the connection end 4211 and the ejection-push end 4212. Generally, the transmission member 421 may be integrally formed, or may be formed in respective molds and then assembled together.

In some embodiments, in order to ensure structural strength, the first transmission member 421, the ejection-push sleeve 431 and so on often have a thickness. After assembly, an overall height is often relatively high, and a required assembly space is correspondingly larger. To this end, a sinking platform 4313 may be disposed on an end surface of the ejection-push sleeve 431 to accommodate the support flange 4213 to reduce the overall height. A stability of a rotation axis of the first transmission member 421 can also be maintained to an extent.

In some embodiments, in order to meet transmission connection requirements between the first transmission member 421 and an upstream structure, it is required to dispose a connection structure on the first transmission member 421. Therefore, the second transmission assembly 420 is further provided with a second transmission member 422 for driving the first transmission member 421 and connecting to the upstream structure to achieve a transfer of transmission torque.

In some embodiments, in consideration that the first transmission member 421 needs to move along a first direction and also needs to transmit a torque transmission, the first transmission member 421 may be sleeved on the second transmission member 422 and can rotate with the second transmission member 422 to achieve a transmission of the torque transmission, and at the same time, the first transmission member 421 can move along the first direction relative to the second transmission member 422.

In some embodiments, in order to achieve relative sliding between the first transmission member 421 and the second transmission member 422 and to achieve the rotation of the first transmission member 421 with the second transmission member 422, an axial through groove 4217 is opened on an inner surface 4214 of the first transmission member 421. A block 4222, which can be embedded in the axial through groove 4217, is disposed on a second-transmission-member outer surface 4221, thereby enabling the first transmission member 421 to rotate with the second transmission member 422. At the same time, the block 4222 may also slide along the axial through groove 4217, thereby achieving a sliding of the first transmission member 421 relative to the second transmission member 422 along the first direction.

In order to meet a torque transmission requirement, a transmission shaft 423 may be coaxially fixed inside the second transmission member 422 for connecting an upstream driver 110 and driving the second transmission member 422.

In some embodiments, in order to ensure that the transmission shaft 423 is fixed into the second transmission member 422, a transmission-shaft hole 4223 may be opened on the second transmission member 422, and a first limit surface 4224 is disposed in the transmission-shaft hole 4223. A second limit surface 4231 is disposed on an outer peripheral surface of the transmission shaft 423. When the transmission shaft 423 is embedded in the transmission-shaft hole 4223, the second limit surface 4231 abuts against the first limit surface 4224, thereby limiting a rotation of the transmission shaft 423 relative to the second transmission member 422.

In some embodiments, in order to meet process requirements and simplify a molding process, the transmission shaft 423 may be configured as a cylindrical member, and a tangential plane is disposed on an outer circumferential surface of the cylindrical member to form a second limit surface 4231. Correspondingly, the transmission-shaft hole 4223 is configured to be in a shape fitting with the second limit surface 4231.

In some embodiments, the first transmission assembly 410 and the second transmission assembly 422 are coaxially sleeved on the transmission shaft 423, and the second transmission assembly 420 can stably move along an axial direction of the transmission shaft 423 toward or away from the first transmission assembly 410, thereby ensuring a stability of the connection and separation between the first transmission assembly 410 and the second transmission assembly 420.

In some embodiments, a moving direction of the ejection-push sleeve 431 may be along the first direction, and an ejection-push direction of the pushing rod 432 may be along the first direction.

In some embodiments, since an overall space in a thickness direction is small and a stroke in the thickness direction is relatively small, a dimension of an ejection-push structure for directly ejecting and pushing along the first direction is required to be very small, and thus a difficulty of molding and assembly the ejection-push structure is undoubtedly greatly increased. Therefore, a structure for ejecting and pushing from another direction may be provided. A first ejection-push surface 4311 that is non-parallel to the first direction may be disposed on the ejection-push sleeve 431, and the ejection-push operations along an ejection-push direction can be implemented by ejecting and pushing the first ejection-push surface 4311. The ejection-push sleeve 431 is pushed toward the first transmission assembly 410 by ejecting and pushing the first ejection-push surface 4311 through the push rod 432.

In some embodiments, in order to optimize an efficiency of the ejection-push operations, an angle between the first ejection-push surface 4311 and the first direction can be set as ranging from 30 degrees to 60 degrees, for example, 30 degrees, 45 degrees or 60 degrees and so on.

In some embodiments, an angle between the ejection-push direction of the push rod 432 and the first direction can be controlled as 90 degrees, to minimize a space required for a cooperation of the push rod 432 and the second transmission assembly 420 and reduce an overall volume of the structure for ejecting and pushing.

In some embodiments, in order to improve a stability of ejecting and pushing from another direction, a second ejection-push surface 4321 in contact with the first ejection-push surface 4311 may be disposed on the push rod 432, to improve a uniformity of a force on the first ejection-push surface 4311 through a surface-to-surface contact ejection-push, thereby ensuring a stability of a moving posture of the ejection-push sleeve 431.

In some embodiments, in order to balance a force on the ejection-push sleeve 431, the number of the first ejection-push surfaces 4311 can be set as two, and the push rod 432 is also correspondingly provided with two push arms 4323 to correspondingly eject and push two first ejection-push surfaces 4311, thereby ensuring the uniformity of the force on the ejection-push sleeve 431 by applying force at two portions. The two push arms 4323 may be connected to a same connection portion 4324 to achieve a synchronous action and ensure a consistent magnitude of applied force, thereby ensuring the evenly applied force on the ejection-push sleeve 431. Correspondingly, the two push arms 4323 are respectively provided with a second ejection-push surface 4321.

In some embodiments, two first ejection-push surfaces 4311 may be disposed on two opposite sides of the ejection-push sleeve 431. The two push arms 4323 may be disposed in parallel. The second ejection-push surface 4321 may be disposed on an end of the push arm 4323 away from the connection portion 4324, and the ejection-push operations can be achieved by pushing the connection portion 4324.

In some embodiments, the numbers of the first ejection-push surface 4311, the second ejection-push surface 4321, and the push arm 4323 may be set to more than two according to specifications of the ejection-push sleeve 431.

In some embodiments, in order to limit a rotation of the ejection-push sleeve 431, a first ejection-push groove 4312 may be opened on the ejection-push sleeve 431. The push rod 432 is, by embedding the push rod 432 in the ejection-push groove 4312, connected to the ejection-push sleeve 432 as a whole, thereby limiting a circumferential rotation of the ejection-push sleeve 432 and ensuring a reliability of the ejection-push operations.

In some embodiments, two first ejection-push grooves 4312 may be provided. The push rod 432 may be provided with two push arms 4323 which are disposed in parallel. The two push arms 4323 may be connected by the connection portion 4324. The two first ejection-push grooves 4312 are disposed on two opposite sides of the ejection-push sleeve 431, thereby stably limiting at two points and ensuring a stability of force subjected by the ejection-push sleeve 431. Correspondingly, first ejection-push surfaces 4311 are respectively disposed on groove walls of the two first ejection-push grooves 4312.

In some embodiments, second ejection-push surfaces 4321 may be respectively disposed on ends of the two push arms 4323 away from the connection portion 4324. Two second ejection-push surfaces 4321 are in contact with the two first ejection-push surfaces 4311 respectively.

In order to limit a radial deviation of the ejection-push sleeve 431, a limit baffle 4322 may be respectively disposed on the two push arms 4323, and the limit baffle 4322 is specifically disposed on a side of the push arm 4323 away from the other push arm, and the two limit baffles 4322 are disposed on two opposite sides of the ejection-push sleeve.

In order to implement the ejection-push operations of the push rod 432, a linear driver 433 may be connected to the push rod 432 to eject and push the push rod 432 in a second direction or reset the push rod 432, and the ejection-push sleeve 431 can be pushed to move in the first direction by the linear driver 433 through the ejection-push sleeve 431, thereby realizing a connection between the first transmission assembly 410 and the second transmission assembly 420 and establishing a torque transmission structure for the door opening and closing device. When the linear driver 433 is reset, the push rod 432 releases the ejection-push sleeve 431, and the first transmission assembly 410 and the second transmission assembly 420 are disconnected, that is, the torque transmission structure for the door opening and closing device is disconnected.

In some embodiments, the linear driver 433 may be a linear movement assembly such as an electromagnetic push rod or a ball screw or the like.

In some embodiments, the driver 110 may be configured as a reduction motor, or a motor equipped with a reduction gearbox, thereby being capable of properly controlling an output torque and rotation speed.

When a clutch control is performed, the linear driver 433 is actuated to push the push rod 432 to move toward the ejection-push sleeve 431, and the second ejection-push surface 4321 opened at a head end of the push rod 432 ejects and pushes the first ejection-push surface 4311, and the ejection-push sleeve 431 moves upward, that is, the ejection-push sleeve 431 moves toward the first transmission assembly 410 and at the same time drives the first transmission member 421 of the second transmission assembly 420 to move toward the first transmission assembly 410, until the connection end 4211 of the first transmission member 421 is embedded in the slot 411 of the first transmission member 410, and a circumferential transmission connection relationship is established. At this time, the linear driver 433 stays in current position, and the ejection-push sleeve 431 is supported at a bottom by the push rod 432, thereby maintaining a connection state for transmission. The driver 110 rotates to drive the rotation of the second transmission member 422, and then drive the first transmission member 421, the first transmission assembly 410 and the linkage gear 120 to rotate, to realize a driving for the door opening and closing. When it is required to disconnect the first transmission assembly 410 from the second transmission assembly 420, the linear driver 433 is reset, and the ejection-push sleeve 431 falls naturally under an action of own weight of the ejection-push sleeve 431, and the connection end 4211 gradually disengages from the slot 411 until the first transmission member 421 and the first transmission assembly 410 is disconnected, thereby disconnecting the linkage gear 120 from the driver 110. During this process, the first transmission member 421 can slide axially relative to the second transmission member 422 to achieve changes in upper and lower positions. A circumferential transmission can be achieved through an embedding-in action between the block 4222 and the axial through groove 4217 inside the first transmission member 421 and the second transmission member 422 respectively. It is worth noting that an action timing of the linear driver 433 is not necessarily earlier than an action timing of the driver 110, that is to say, there is no necessary order between the action timings of the linear driver 433 and the driver 110.

In some embodiments, the linkage gear 120 is configured as a component to directly drive the door rotation mechanism 200 and the door ejection mechanism 300, and thus the linkage gear 120 should be able to simultaneously drive the door rotation mechanism 200 and the door ejection mechanism 300. A detailed structure of the linkage gear 120 is described in detail below.

Referring to FIGS. 14, 15, 16, 17 and 18, in some embodiments, a body of the linkage gear 120 may be configured as a rotation member at the base 600, and is provided with a third tooth portion 121 meshing with a upstream driver 110, to drive the door ejection mechanism 300 and the drive member 210 in a way of outputting torque through rotation. In order to meet a driving demand of the drive member 210, a first ejection-push portion 1231 and a second ejection-push portion 1232 may be disposed oppositely at the body, and a space enough to accommodate the drive member 210 is kept between the first ejection-push portion 1231 and the second ejection-push portion 1232. Therefore, in an actual assembly state, the drive member 210 can, respectively by the first ejection-push portion 1231 and the second ejection-push portion 1232, be ejected and pushed to rotate at two sides of the moving member 210. Therefore, when the body of the linkage gear 120 rotates in a forward direction and a reverse direction, the drive member 210 is ejected and pushed to rotate in two opposite directions respectively, thereby driving the door rotation member 220 to eject and push, or pull the door body 920 to realize the door opening and closing operations.

In some embodiments, the second ejection-push portion 1232 may be configured as a door-opening ejection-push portion, and the first ejection-push portion 1231 may be configured as a door-closing ejection-push portion; that is, when the linkage gear 120 rotates in the forward direction, the second ejection-push portion 1232 pushes the drive member 210 toward the door body 920 to push the door rotation member 220 to eject and push the door body 920 to implement door opening. When the linkage gear 120 rotates in the reverse direction, the first ejection-push portion 1231 pushes the drive member 210 away from the door body 920 to push the door rotation member 220 to pull the door body 920 to implement door closing.

In some embodiments, during a door opening process, in order to meet a timing control of first implementing a door-ejection operation and then implementing a door-rotation operation, a spacing between the first ejection-push portion 1231 and the second ejection-push portion 1232 can be designed to match the timing control. That is, a deflection space can be left between the first ejection-push portion 1231 and the second ejection-push portion 1232, and when the drive member 210 deflects relative to the body, the drive member 210 needs to rotate from the first ejection-push portion 1231 to the second ejection-push portion 1232 by a first angle, and thus a time difference between a deflection of the linkage gear 120 and a deflection of the drive member 210 which is pushed is enabled by setting an initial position of the drive member 210. Therefore during a door opening process, when the linkage gear 120 rotates and drives the door ejection mechanism 300 to implement ejection-push operations, the door rotation mechanism 200 does not implement an active door-rotation operation at the same time, but is delayed for a period of time and then implements, under the driving of the linkage gear 120, the active door-rotation operation.

In some embodiments, a position in which the drive member 210 abuts against the first ejection-push portion 1231 may be configured as an initial position of the drive member 210, and during a door opening process after the linkage gear 120 starts to rotate, the drive member 210 gradually approaches the second ejection-push portion 1232 from the first ejection-push portion 1231, thereby being capable of accurately controlling a time for the second ejection-push portion 1232 to eject and push the drive member 210, and the door rotation mechanism 200 and the door ejection mechanism 300 are seamlessly connected, a smooth door opening is achieved, and poor matching defects such as jamming and vibration are avoided.

A deflection angle of the drive member 210 can be set according to a designed opening degree of the door body 920 to meet door-rotation requirements. The deflection angle of the drive member 210 is correspondingly controlled as a first angle. A value of the first angle is also related to an initial position and length of the drive member 210 and so on, and can be adjusted and set according to actual assembly conditions.

Figure 19:
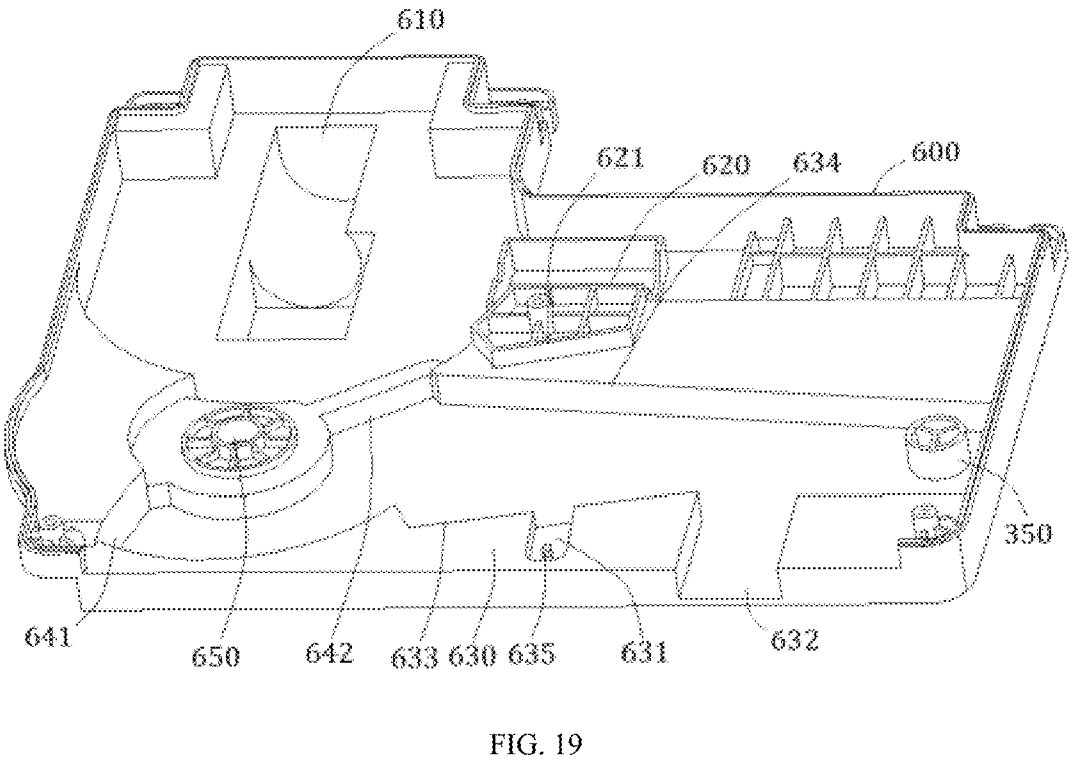
FIG. 19 is a schematic diagram of a base of the door opening and closing device in FIG. 1.

Referring to FIG. 1, FIG. 10 and FIG. 19, in some embodiments, in order to improve a position control accuracy of the drive member 210 and prevent the drive member 210 from being out of position, a second stop member 620 may be disposed on the base 600 to prevent the drive member 210 from being excessively deflected. The second stop member 620 may be disposed between the second ejection-push portion 1232 and the first ejection-push portion 1231. A position in which the drive member 210 abuts against the first ejection-push portion 1231 may be configured as an initial position of the drive member 210, to limit the drive member 210 between the second stop member 620 and the first ejection-push portion 1231 to ensure a reliability of the initial position of the drive member 210. A position of the second stop member 620 may be set according to a width and a preset initial position of the drive member 210, with reference to an initial position of the first ejection-push portion 1231, and with a distance between the second stop member 620 and the first ejection-push portion 1231 being slightly larger than a width of the drive member 210 as a standard.

In some embodiments, a stop surface 621 matching a profile of a side wall of the drive member 210 may be disposed on the second stop member 620 to ensure uniform force subjected by the drive member 210 in a stopped state and avoid a local force concentration that may cause structural damage.

In some embodiments, in order to improve a rotation control precision and reliability of the drive member 210, the body and the first end of the drive member 210 may be coaxially and rotatably disposed on the base 600, thereby enabling a control of angle of the drive member 210 by controlling a rotation angle of the body, and thus a convenience is greatly improved. In other embodiments, the first end of the drive member 210 may not be coaxially disposed with the body, and the drive member 210 may just be pivotally connected to the body of the linkage gear 120 to form a crankshaft drive-like structure. The drive member 210 may also be rotationally disposed on the base, and two push arms may be simultaneously extended out and the two push arms may be provided with the first ejection-push portion 1231 and the second ejection-push portion 1232, respectively, and the drive member 210 may be disposed between the two push arms, and thus the ejection-push operations can be realized. Positions, and dimensions of components of the above structures may be determined according to experiments to meet requirements of cooperations.

In some embodiments, in order to drive the door ejection mechanism 300, the body of the linkage gear 120 is provided with a third ejection-push portion 122 for connecting and driving the door ejection mechanism 300. During a door-opening operation, the body of the linkage gear 120 rotates in the forward direction and drives the door ejection mechanism 300 to push the door body 920. Relatively, during a door-closing operation, the body of the linkage gear 120 rotates in the reverse direction to drive the door ejection mechanism 300 to be reset.

In some embodiments, a door-ejection operation only needs to break through the door opening resistances mainly composed of the adsorption force between the door body 920 and the box body 910, and ejects the door body 920 to open by a small angle, and thus an ejecting and pushing stroke of the door ejection mechanism 300 is also small. Accordingly, a connection of the linkage gear 120 to the door ejection mechanism 300 and a stroke and time for ejecting and pushing the door ejection mechanism 300 may also be set according to a relatively short door ejection process, that is, after the door rotation mechanism 200 actively performs a door-rotation operation, the door ejection mechanism 300 and the linkage gear 120 can be disconnected or can be disconnected after a short period of time, thereby simplifying a structural linkage state under a working state and avoiding a mutual interference.

Figure 15:
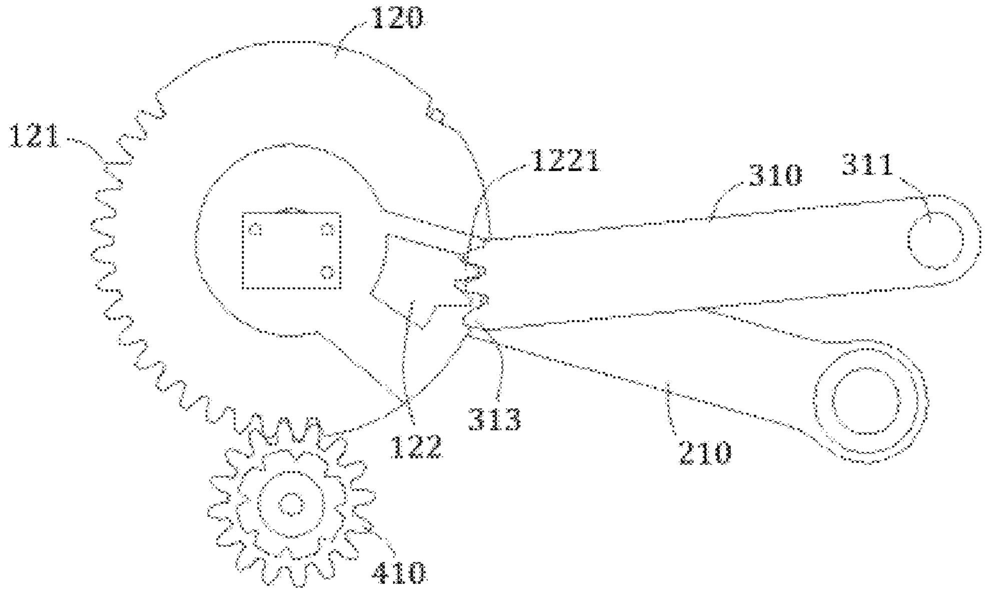
FIG. 15 is a schematic diagram showing an assembly state of the linkage member and a linkage gear of the door opening and closing device in FIG. 1.

Referring to FIG. 15, in order to improve an accuracy and reliability of a time control of connection and disconnection, a first tooth portion 313 may be disposed on the door ejection mechanism 100. The third ejection-push portion 122 is provided with a second tooth portion 1221 which meshes with the first tooth portion 313 for transmission. Therefore, a stable drive can be achieved by a way of meshing transmission. Meanwhile, an ejecting and pushing stroke may be adjusted by controlling a length and number of teeth for meshing. During the door opening process, the linkage gear 120 rotates in the forward direction, that is, the linkage gear 120 drives the door ejection mechanism 100 to eject and push the door body 920 through the way of meshing transmission until the second tooth portion 1221 and the first tooth portion 313 is disengaged, and the door ejection mechanism 100 will no longer be subjected to a force. During the door closing process, the linkage gear 120 rotates in the reverse direction, and when the linkage gear 120 rotates to a set angle, the first tooth portion 313 and the second tooth portion 1221 are re-meshed, and then the door ejection mechanism 100, under the driving of the linkage gear 120, moves in a direction reverse to a direction along which the door is ejected, until the door ejection mechanism 100 is reset.

In some embodiments, a control of door ejection stroke of the door ejection mechanism 100 may be achieved based on a deflection control of the drive member 210. An angle by which the linkage gear 120 rotates during a period from when the first tooth portion 313 and the second tooth portion 1221 begin to mesh to when the first tooth portion 313 and the second tooth portion 1221 separate may be set as a second angle. It is considered that the first angle is an angle by which the body of the linkage gear 120 rotates, when the body starts to rotate, relative to the drive member 210, that is, the first angle is an angle by which the body of the linkage gear 120 rotates within a time period during which the door rotation mechanism 200 is delayed to implement a door-rotation operation. Therefore, the first angle can be controlled to be less than or equal to the second angle, that is, a time period of meshing is controlled based on a relationship of the first angle and the second angle, thereby controlling a length of the teeth for meshing.

In some embodiments, in order to ensure a smooth connection between a door ejection process and a door rotation process, a difference between the first angle and the second angle can be controlled as being within 1 degree. That is, when the drive member 210 abuts against the second ejection-push portion 1232, the first tooth portion 313 and the second tooth portion 1221 still have a short segment thereof to be maintained in a meshing state, or have a last tooth pair to be maintained in the meshing state.

Figure 14:
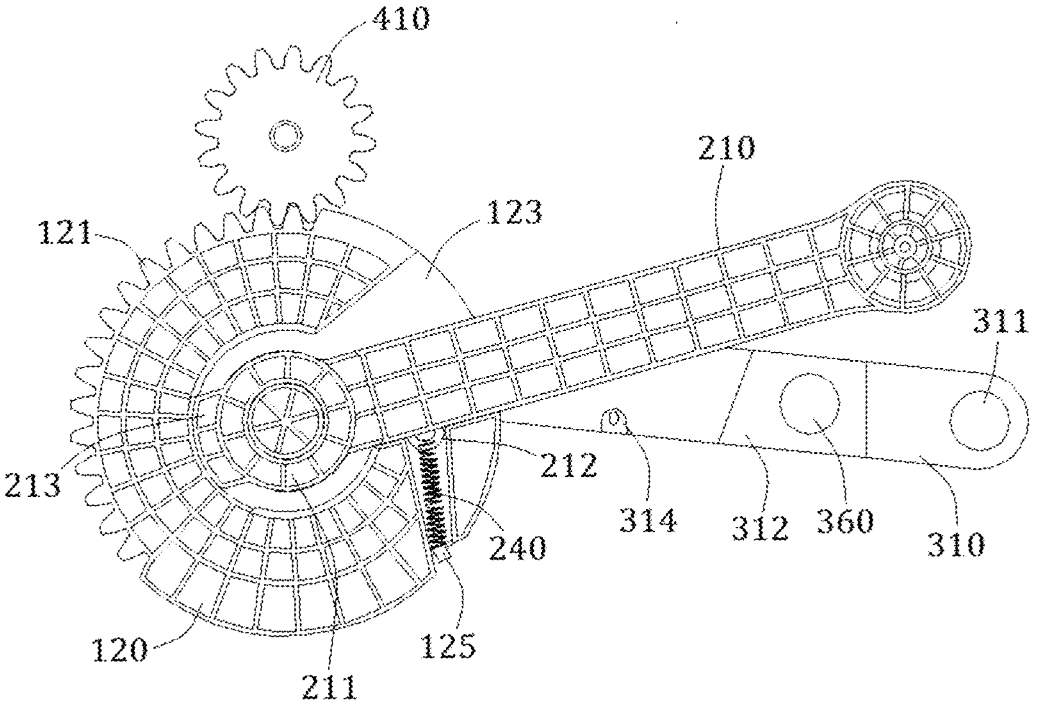
FIG. 14 is a schematic diagram showing an assembly state of a drive member and a linkage gear of the door opening and closing device in FIG. 1.
Figure 16:
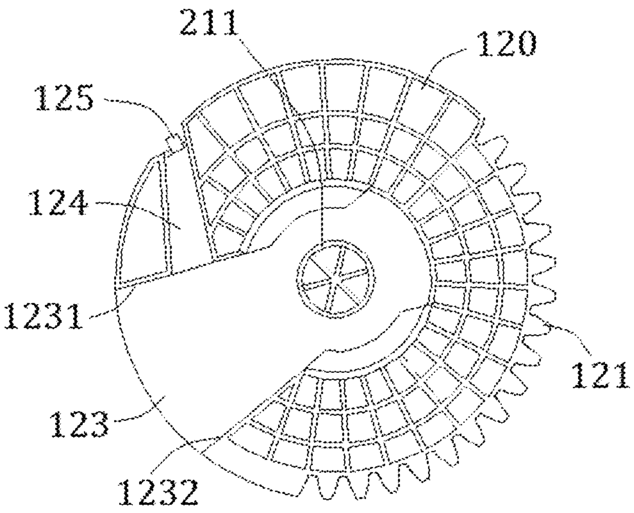
FIG. 16 is a top view of the linkage gear of the door opening and closing device in FIG. 1.
Figure 17:
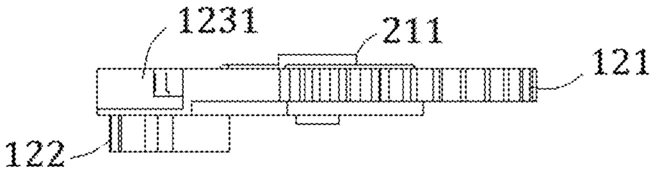
FIG. 17 is a front view of the linkage gear of the door opening and closing device in FIG. 1.
Figure 18:
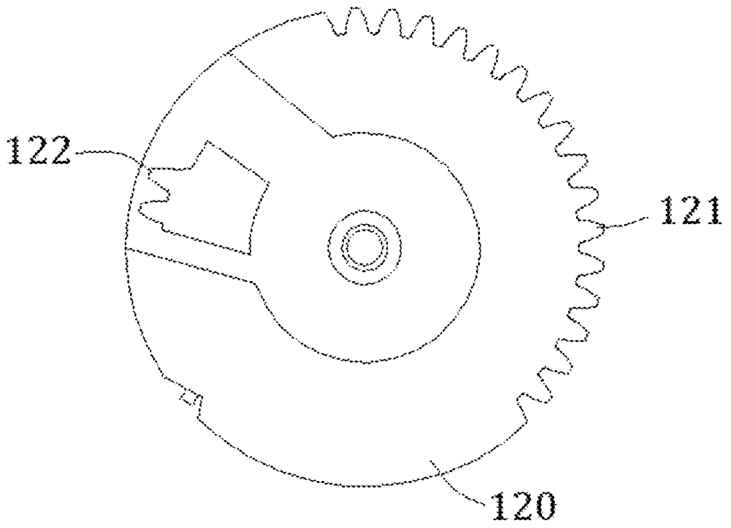
FIG. 18 is a bottom view of the linkage gear of the door opening and closing device in FIG. 1.

Referring to FIG. 14 and FIG. 16, in some embodiments, in order to smoothly control a deflection posture of the drive member 210, a rotation limit groove 123 may be opened at the body of the linkage gear 120. The body of the linkage gear 120 and the drive member 210 are kept to be coaxially rotatably disposed on the base 600. A coaxial rotation shaft 211 may be disposed in the rotation limit groove 123. The drive member 210 may be rotatably disposed in the rotation limit groove 123. The first ejection-push portion 1231 and the second ejection-push portion 1232 are configured as groove walls of the rotation limit groove 123 in a radial direction of the linkage gear 120, that is, the rotation limit groove 123 is configured as a fan-shaped groove. The rotation limit groove 123 accommodates the drive member 210, thereby reducing an overall assembly height. At the same time, a sinking groove structure can also effectively protect the drive member 210, and improve an impact and vibration resistance of an ejecting and pushing area, and thus a reliability of the rotation limit groove 123 is ensured.

In some embodiments, in order to ensure that a position at which the drive member 210 abuts against the first ejection-push portion 1231 is an initial position and in order to resist an influence of vibration on a position and posture of the drive member 210, a reset spring 240 can be provided. Two ends of the reset spring 240 are respectively connected to the body of the linkage gear 120 and the drive member 210, to maintain a tension between the drive member 210 and the first ejection-push portion 1231, thereby forming a tendency to approach one another, and to guide the drive member 210 to abut against the second ejection-push portion 1231 after the door body 920 is opened. In other embodiments, the reset spring 240 may also be replaced with a leaf spring, or other elastic materials, to achieve position limiting by elastic ejecting and pushing, tensioning and so on.

In some embodiments, in order to facilitate fixation, a first fix seat 212 may be disposed at the drive member 210 for fixing a first end of the reset spring 240. A second fix seat 125 may also be disposed at the body of the linkage gear 120 to fix a second end of the reset spring 240.

Referring to FIG. 16, in consideration of a deformation characteristics of the reset spring 240, a reset-spring accommodation groove 124 is opened at the body of the linkage gear 120. The reset spring 240 can be disposed in the reset-spring accommodation groove 124. Therefore, not only an assembly of the reset spring 240 on the linkage gear 120 is achieved, but also the reset spring 240 is prevented from external impact or scratch, to ensure a stability of deformation state of the reset spring 240. In this embodiment, the reset-spring accommodation groove 124 may also be configured as a fan-shaped groove, with a side close to the rotation limit groove 123 being relatively wider, thereby adapting to a deflection process of the drive member 210 and avoiding the reset spring 240 from deformation due to resisting and bending.

In some embodiments, in order to improve a functional stability and positioning reliability of the linkage gear 120, a third stop member 641 and a fourth stop member 642 may be disposed on the base 600, and are respectively disposed at the two ends of a rotation trajectory of the linkage gear 120 to prevent excessive rotation of the linkage gear 120 and ensure positioning accuracies of a forward rotation and a reverse rotation. When the door body 920 is closed, the third stop member 641 stops the linkage gear 120 from revolving. When the door body 642 is opened to a limiting position, the fourth stop member 642 stops the linkage gear 120 from revolving.

In some embodiments, a limit rotation angle of the linkage gear 120 may be determined according to a designed opening degree of the door body 920. A rotation angle of the linkage gear 120 between the third stop member 641 and the fourth stop member 642 may be set to be 130 degrees or more than 90 degrees. The rotation angle may also be disposed to be 120 degrees or other specific degrees.

Referring to FIG. 14, in some embodiments, in order to ensure the balanced posture of the drive member 210, an extension limit portion 213 may be provided at an end of the drive member 210, and the extension limit portion 213 is pressed against the base 600 to avoid unilateral warping of the drive member 210. In other embodiments, a self-lubricating material layer may be further disposed on the extension limit portion 213 to reduce a contact friction coefficient.

The door rotation mechanism 200 and the door ejection mechanism 300 will be described below respectively.

Referring to FIG. 10, in some embodiments, a hinge seat 230 may be disposed on the door body 920, and hinged to the door-rotation-member first end 221. In order to ensure a hinge reliability and force uniformity, the hinge seat 230 may be configured as a U-shaped double-arm hinge seat, and the door-rotation-member first end 221 is embedded in the hinge seat 230 and fixed by a hinge shaft.

In some embodiments, the drive member 210 and the door rotation member 220 may be configured to be plate-shaped, and in a condition that the drive member 210 and the door rotation member 220 are stacked, an installation height can be greatly reduced.

Referring to FIG. 14, in some embodiments, pivoting portions of the drive member 210 and the door rotation member 220 may be respectively configured to have a reduced thickness, and the pivoting portions of the drive member 210 and the door rotation member 220, when pivoting in a superimposed state, have an overall reduced thickness and height. Pivoting portions of the drive member 210 and the door rotation member 220 may also be configured as a pivot shaft 214 which is rotatably disposed at a lower plate-like member to support an upper plate-like member to form a stable and reliable pivot structure. In other embodiments, an end of one of the drive member 210 and the door rotation member 220 may be configured as a U-shaped pivot seat, and an end of another one of the drive member 210 and the door rotation member 220 may be embedded in the U-shaped pivot seat and fixed by the pivot shaft 214.

Figure 11:
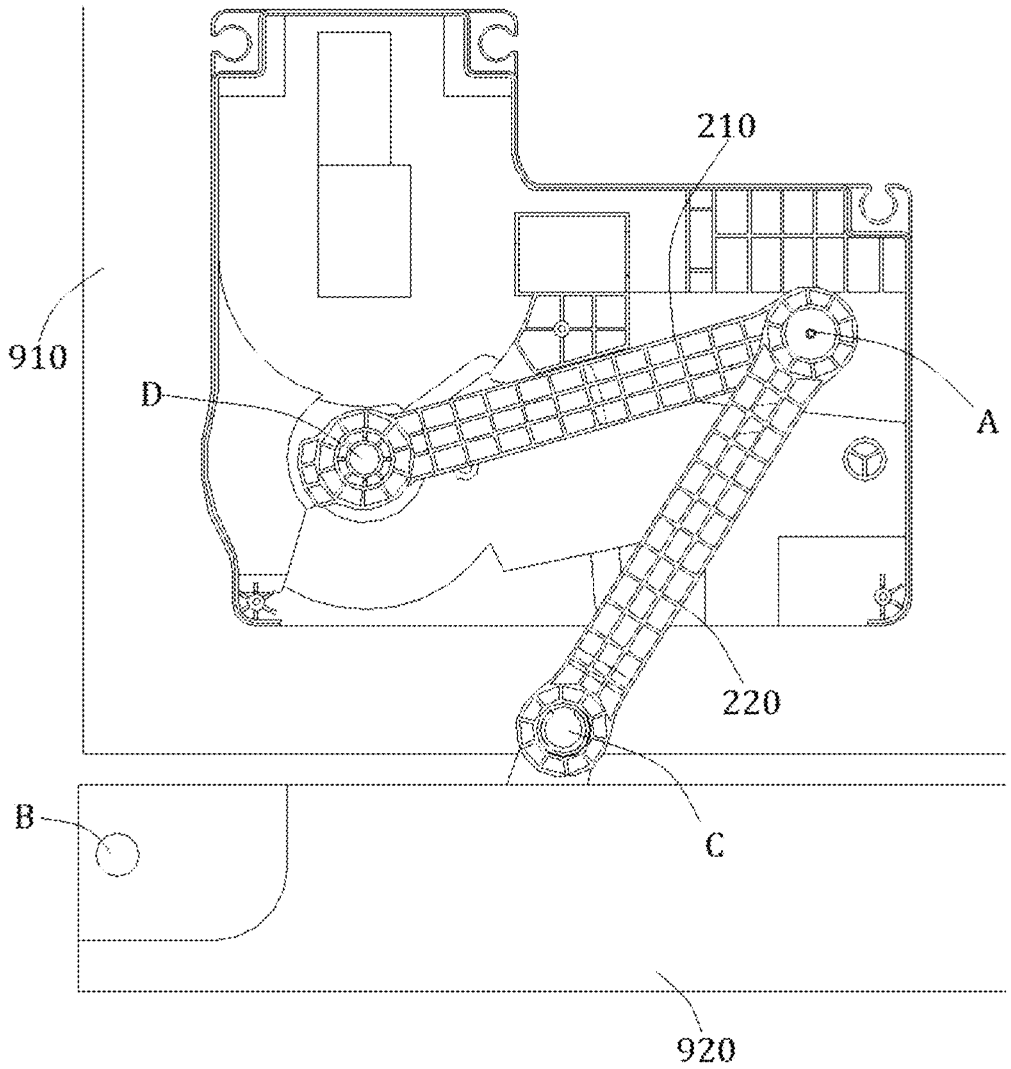
FIG. 11 is a schematic diagram showing an arrangement position of the door rotation mechanism of the door opening and closing device in FIG. 1.

Referring to FIG. 11, in some embodiments, in order to ensure a door rotation efficiency and structural stability of the door rotation mechanism 200 and reduce an influence of a relative deflection state and extension length of the drive member 210 and the door rotation member 220 on an opening degree and door-rotation speed of the door body 920, the door rotation mechanism 200 and a hinge point C of the door rotation mechanism 200 and the door body 920 can be planned and arranged in combination with a rotation center B of the door body 920 of the electrical apparatus and a layout position of the base 600. The hinge point C between an end of the door rotation member 220 and the door body 920, a hinge point A between the drive member 210 and an end of the door rotation member 220, and a hinge point D through which another end of the drive member 210 is rotatably disposed on the base 600, can be designed in a distribution state, that is, the hinge point A and the rotation center B are respectively located at two sides of a connection line between the hinge point C and the hinge point D, and thus a convex quadrilateral is formed by connecting hinge points A, B, C and D in sequence, thereby avoiding the drive member 210 and the door rotation member 220 from forming a deflection of more than 180 degrees during a rotation process. The deflection of more than 180 degrees may result in an extreme state that there is no force that can be acted on the door rotation member 220, and thus the door rotation member 220 is unable to rotate the door body 920, and a range of opening degree of the door body 920 is also limited and reduced.

In some embodiments, in order to maximize an opening angle of the door body 920 and the box body 910 themselves without being overly restricted by the door rotation mechanism 200, a position of the hinge point C between an end of the door rotation member 220 and the door body 920, a position of the hinge point D between another end of the drive member 210 and the base 600, and a length of two hinge points of the drive member 210 and the door rotation member 220 may be set according to a principle that a quadrangle formed by connecting the hinge point A, the hinge point C, the rotation center B and the hinge point D in sequence is a parallelogram. In this state, regardless of factors such as a width and thickness of structural components such as a rotation shaft and a hinge, the opening degree of the door body 920 can be close to 180 degrees. In one embodiment, the opening degree of the door body of a refrigerator is not the bigger the better, but it is determined based on factors such as installation conditions, usage requirements, convenience and so on. In other embodiments, with the above arrangement, the opening degree of 130 degrees can be stably and reliably achieved for the door body.

In some embodiments, the drive member 210 and the door rotation member 220 may be configured to be rod-shaped, to be compatible with a small-sized and high-strength door rotation structure.

In some embodiments, the linkage gear 120 is configured as a component to directly drive the drive member 210 and the door ejection mechanism 300, and thus the linkage gear 120 should be able to simultaneously drive the drive member 210 and the door ejection mechanism 300.

In some embodiments, the door ejection mechanism 300 serves as an actuator for initially ejecting and opening the door body 920 to a preset angle, and can realize the door-opening operation by gradually accumulating force under the driving of the drive mechanism 100. A structure of the door ejection mechanism 300 will be described in detail below.

Referring to FIG. 1 and FIG. 12, in some embodiments, the door ejection mechanism 300 includes a linkage member 310 and a door ejection member 320. An end of the linkage member 310 is connected to the drive mechanism 100 for obtaining the driving force. The linkage member 310 can act under the driving of the drive mechanism 100. Another end of the door ejection member 320 is configured to eject and push the door body 920 to rotate. The door ejection member 320 is connected to the linkage member 310, and a door-ejection operation and a reset are implemented under the driving of the linkage member 310.

In some embodiments, an end of the linkage member 310 is rotatably disposed on the base 600, and thus can deflect around a rotation axis under the driving of the drive mechanism 100. The door ejection member 320 is rotatably connected to the linkage member 310, and thus can move along an arc trajectory with the linkage member 310, and continues to eject and push the door body 920 after abutting against the door body 920. A deflection structure of the linkage member 310 can reduce a front pressure on the door ejection mechanism 300 to a extent while an ejecting and pushing effect is also ensured, thereby ensuring a structural stability and service life and improving a reliability of door-ejection operation.

In some embodiments, in order to further improve efficiencies of the door-ejection operations, the door ejection member 320 can be rotatably connected to the linkage member 310, and the door ejection member 320 can be deflected relative to the linkage member 310 and posture of the door ejection member 320 can be adjusted. A direction to which the door ejection member 320 is pointed can be adaptively adjusted according to installation conditions of the door ejection member 320, and the door ejection member 320 can face the door body 920, thereby ensuring an efficient ejecting and pushing. On the other hand, the door ejection mechanism 300 can adapt to requirements of different installation conditions, flexibly adjust a fitting state of the linkage member 310 and the door ejection member 320, and ensure a high-efficiency ejection-push performance.

In some embodiments, the door ejection member 320 is rotatably connected to a middle portion of the linkage member 310, thereby leaving a sufficient deflection space for the door ejection member 320 to avoid an interference with other structures.

In order to ensure a high door ejection efficiency, the ejection-push direction of the door ejection member 320 may be set as being approximately perpendicular to the door body 920 which is closed. Since the door ejection member 320 rotates with the linkage member 310, the ejection-push direction will also be deflected to an extent. In order to achieve that the door ejection member 320 is as perpendicular to the door body 920 as possible and stably applies an ejection-push force, a waist-shaped hole 322 can be opened on the door ejection member 320, and a pin shaft 360 is disposed on the linkage member 310. The door ejection member 320 can be deflected relative to the linkage member 310 by movably embedding the pin shaft 360 in the waist-shaped hole 322. At the same time, a space along a length direction of the waist-shaped hole 322 can be reserved as a sliding space for the pin shaft 360, and the door ejection member 320 can relatively slide along the length direction of the waist-shaped hole 322 without having to move with the linkage member 310, thereby maintaining a stability of the ejection-push direction of the door ejection member 320. A length of the waist-shaped hole 322 can be designed according to a length of a door ejection stroke. For example, the longer the door ejection stroke is, the longer the length of the waist-shaped hole 322 is.

In some embodiments, in order to meet requirements of greater ejection-push force and ejection-push stroke with a smaller size of the waist-shaped hole 322, the length direction of the waist-shaped hole 322 may be disposed perpendicular to the ejection-push direction of the door ejection member 320. In other embodiments, the length direction of the waist-shaped hole 322 does not have to be strictly disposed perpendicular to the ejection-push direction of the door ejection member 320, i.e., there may be an angle between the length direction of the waist-shaped hole 322 and the ejection-push direction of the door ejection member 320, as long as that a moving stroke of the pin shaft 360 has a component in the ejection-push direction of the door ejection member 320, thereby ensuring that an axial ejection-push posture of the pushing rod 320 is stable. The angle between the length direction of the waist-shaped hole 322 and the ejection-push direction of the door ejection member 320 may be set as 30 degrees, 45 degrees, or 60 degrees.

In some embodiments, in order to ensure a balanced force applied on the door ejection member 320, the linkage member 310 may be disposed below the door ejection member 320 to support the door ejection member 320 to an extent, and the pin shaft 360 can be stably embedded in the waist-shaped hole 322 in an axial direction of the pin shaft 360 without a risk of detachment, thereby ensuring a stability of a pivoting function and sliding function of the waist-shaped hole 322 and the pin shaft 360.

In some embodiments, the waist-shaped hole 322 may be disposed on the linkage member 310, and the pin shaft 360 may be disposed on the door ejection member 320. In order to ensure a stability of the pivoting function and the sliding function, the linkage member 310 may also be disposed above the door ejection member 320, which is not limited here.

In some embodiments, in order to reduce an overall installation height, reduce an apparatus scale and reduce installation space requirements and material costs, a thickness reduction groove 312 may be opened on the linkage member 310 in a condition that a structural strength of the linkage member 310 can be ensured, thereby reducing a stacked thickness of the linkage member 310 and the door ejection member 320. A width of thickness reduction groove 312 may be configured to be slightly larger than a width of area passed by the door ejection member 320 on the linkage member 310 when the door ejection member 320 deflects in the waist-shaped hole 322, to prevent a side wall of the thickness reduction groove 312 from blocking a deflection of linkage member 310 relative to the door ejection member 320.

Referring to FIGS. 12 and 19, in some embodiments, during a deflection of the linkage member 310, the door ejection member 320 will, affected by a friction between the pin shaft 360 and the waist-shaped hole 322, still have a tendency to move in a direction perpendicular to the ejection-push direction, and thus, a guide groove 632 can be opened on the base 600. The door ejection member 320 can be slidably disposed in the guide groove 632 along a set door ejection direction, to limit a displacement of the door ejection member 320 in a direction perpendicular to the ejection-push direction and ensure the stability of the door ejection operations. In order to enhance a guiding and limiting effect, a width of the guiding groove 632 along the direction perpendicular to the ejection-push direction may be set to be slightly larger than a width of the door member 320, with only a gap reserved for sliding.

In some embodiments, in order to ensure a smooth sliding of the door ejection member 320, a self-lubricating material layer may be disposed on a groove surface of the guide groove 632, or a portion of the door ejection member 320 which slides in the guide groove 632 may be provided with a self-lubricating material layer, or both the groove surface of the guide groove 632 and the portion of the door ejection member 320 which slides in the guide groove 632 may be provided with a self-lubricating material layer, or the guide groove 632 and the door ejection member 320 may be directly formed by self-lubricating material to further reduce an impact of friction.

Referring to FIG. 12, in some embodiments, in consideration of influences of assembly accuracy and fitting clearance, an ejection-push seat 330 may be hinged on an end of the door ejection member 320 away from the linkage member 310, and when the door ejection member 320 contacts the door body 920, the ejection-push seat 330 will first abut against the door body 920 and can adaptively deflect, and the ejection-push seat 330 and the door body 920 can achieve an surface-to-surface contact, thereby ensuring a stability of size and posture of a contact surface, ensuring a stability of direction and magnitude of a force applied for door ejection, and reducing a risk of excessive contact pressure which will cause damage to the door body or the door ejection member 320 due to a small contact surface.

In some embodiments, in order to improve an adaptability in all directions, the ejection-push seat 330 and the door member 320 may be connected by a universal hinge structure.

In some embodiments, in order to reduce a contact vibration between the ejection-push seat 330 and the door body 920 and the ejection-push seat 330, a shock-absorb pad 340 may be disposed on the ejection-push seat 330. The shock-absorb pad 340 may be made of a material with a low friction coefficient.

In some embodiments, a second end of the linkage member 310 is provided with a first tooth portion 313 that meshes with the drive mechanism 100, and the linkage member 310 is driven to rotate through gear meshing transmission, thereby achieving a precise control of rotation amplitude of the linkage member 310, and in turn improving a control accuracy of ejection-push stroke of the door ejection mechanism 300.

In some embodiments, in consideration that during the door ejection operation, in a condition that the door body 920 is ejected and pushed to have a small opening degree, the adsorption force between the door body 920 and the box body 910 can be broken through, and thus a deflection angle for breaking through the adsorption force of the door body 920 relative to the box body 910 may be set to be about 3 degrees, and thus the ejection-push stroke is also correspondingly smaller, and a deflection angle of the linkage 310 can also be set to be small. Usually, a position of the linkage member 310 on the base 600 can be determined according to the deflection angle for breaking through the adsorption force and the door-rotation resistance, and a preset position of linkage member 310 on the base 600 is determined.

Referring to FIG. 12, in some embodiments, in order to ensure a control accuracy of rotation angle of the linkage member 310, an elastic limit member 370 may be connected between the base 600 and the linkage member 310 to always pull the linkage member 310 toward a preset position. Therefore a control accuracy of the linkage member 310 can be ensured, and a positioning accuracy and stability of a meshing connection of the linkage member 310 with the drive mechanism 100 can also be ensured.

In some embodiments, the elastic limit member 370 may be a tension spring, two ends of which are respectively connected to the linkage member 310 and the base 600. A stable elastic tensioning force can be applied through elastic elongation and deformation of the elastic limit member 370. A deflection process of the linkage member 310 can be adapted based on an adaptive deformation of the tension spring, and a stability of elastic tensioning effect can be ensured. In other embodiments, the elastic limit member 370 may also be an elastic member in other forms such as a spring plate.

Referring to FIGS. 12, 14 and 19, in some embodiments, a third fix seat 314 may be disposed on the linkage member 310, and a fourth fix seat 635 may be disposed on the base 600. The third fix seat 314 and the fourth fix seat 635 are respectively configured to fix two ends of the tension spring, thereby improving a stability of the tension spring under deflection and deformation.

In some embodiments, a first stop member 630 may be further disposed on the base 600 and disposed at an end point of a preset deflection stroke of the linkage member 310. The door ejection mechanism 300, when deflected to a preset angle relative to the base 600, abuts against the first stop member 630, thereby limiting an excessive deflection of the linkage member 310 and limiting further deflection of the door ejection mechanism 300 as a whole. At the same time, the first stop member 630 can also ensure that a stable meshing connection of the first tooth portion 313 and the drive mechanism 100 can be established.

Referring to FIG. 19, in some embodiments, the linkage member 310 is driven by the drive mechanism 100 to perform a door ejection deflection and door reset deflection, and thus two deflections in opposite directions relative to the base 600 will be generated, and there are two deflection limiting position. In order to ensure a position control accuracy of the linkage member 310, a first stop surface 633 and a second stop surface 634 may be respectively disposed on the first stop member 630, and are respectively arranged at two end points of the preset deflection stroke of the linkage member 310 to realize a limit for two deflections in opposite directions. In some embodiments, the first stop surface 633 and the second stop surface 634 may be configured to be surfaces which match with outer profile surfaces of the linkage member 310, thereby improving a reliability of limit.

In some embodiments, the first stop member 630 may be an independent structural member installed on the base 600, and a height of the first stop member 630 is slightly higher than a height of the linkage member 310, thereby realizing a stop function. In other embodiments, the first stop member 630 may also be directly formed on the base 600, that is, an integrated structure having a stop surface or a stop member portion may be formed on the base 600.

In some embodiments, the first stop member 630 may be disposed corresponding to the elastic limit member 370, that is, the linkage member 310 may be elastically tightened or elastically pressed toward the first stop member 630 by configuring an installation position of the elastic limit member 370.

Referring to FIGS. 12 and 19, in some embodiments, an elastic-member accommodation groove 631 may be opened on the first stop member 630. A first end of the elastic limit member 370 may be connected in the elastic accommodation groove 631 to not only enable the elastic limit member 370 to be assembled on the base 600, but also protect the elastic limit member 370 through a groove structure to avoid scratches and collisions that affect a deformation state of the elastic limit member 370, thereby ensuring a reliability and accuracy of the linkage member 310.

Referring to FIGS. 12, 14 and 19, in some embodiments, the fourth fix seat 314 may be disposed on a portion of the linkage member 310 between the first tooth portion 313 and the pin shaft 360, that is, the fourth fix seat 314 is located between a force bearing point and a force application point of the linkage member 310, thereby improving an elastic limiting effect to an extent and improving a performance of the linkage member 310 in resisting vibration and external interference.

In some embodiments, in order to adapt to a deflection action of the linkage member 310, a second end of the elastic limit member 370 will also deflect to a degree, and the elastic limit member 370 as a whole will deflect with the first end of the elastic limit member 370 as a center. In order to prevent the elastic accommodation groove 631 from scratching, abutting against the elastic limit member 370 to affect a deformation state of the elastic limit member 370, a groove body shape of the elastic accommodation groove 631 may be configured as a fan-shaped shape to leave sufficient space for deflection.

In some embodiments, the linkage member 310 may be configured as a plate, and a thickness direction of the linkage member 310 is configured to be perpendicular to the deflection direction, thereby ensuring a structural strength under a condition of the door ejection operation, and also reducing an overall assembly thickness of the linkage member 310 and a height requirement for installation. The door ejection member 320 may also be configured as a plate member, and a thickness direction of the door ejection member 320 is configured to be perpendicular to the deflection direction and the ejection-push direction, thereby reducing an overall assembly height. In other embodiments, the linkage member 310 and the door ejection member 320 may also be configured as rod members.

Referring to FIGS. 14 and 15, in some embodiments, the first tooth portion 313 may be disposed at a first end of a plate body of the linkage member 310, and a linkage-member pivot hole 311 is opened at a second end of the plate body of the linkage member 310. A linkage-member pivot shaft 350 is disposed on the base 600, and the linkage-member pivot shaft 350 is rotatably embedded in the linkage-member pivot hole 311, and the linkage member 310 can rotate relative to the base 600, thereby reducing an overall volume of the linkage member 310 in a condition that a linkage function is achieved. In other embodiments, a waist-shaped hole 322 may also be disposed at a first end of plate body of the door ejection member 320, to reduce a length and width and overall volume of the door ejection member 320 while functional requirements for door ejection can be met.

In some embodiments, in order to improve a structural strength of the linkage member 310 and the door ejection member 320, reinforcement ribs may be disposed on plate bodies of the linkage member 310 and the door ejection member 320.

When the door opening and closing device is assembled to an electrical apparatus having a box body 910 and a door body 920 hinged to the box body 910, the base 600 may be fixed on the box body 910, and the door ejection direction of the door ejection member 320 directly faces the door body 920. When the door opening operation is performed, the drive mechanism 100 drives the linkage member 310 to deflect in a forward direction relative to the base 600, to drive the door ejection member 320 to slide along the guide groove 632 until the door ejection member 320 contacts the door body 920 and the ejection-push force gradually increases until the ejection-push force breaks through the adsorption force and other rotation resistance between the door body 920 and the box body 910, thereby ejecting and opening the door body 920. When the door closing operation is performed, the drive mechanism 100 drives the linkage member 310 to deflect in a reverse direction relative to the base 600, to drive the door ejection member 320 to slide in the reverse direction along the guide groove 632 until the door ejection member 320 is reset.

Figure 13:
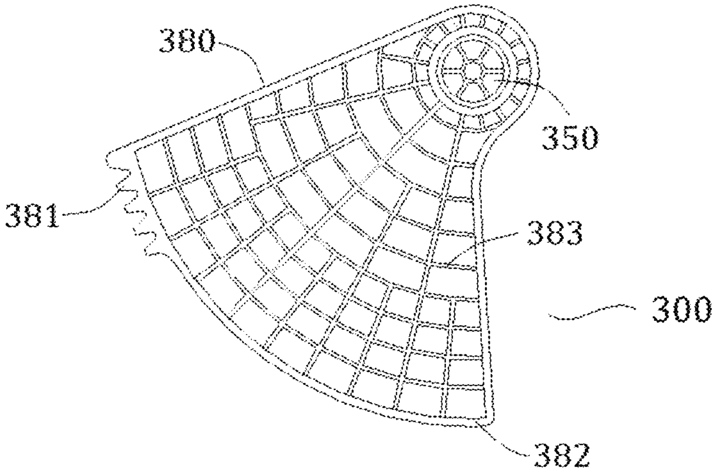
FIG. 13 is another schematic structural diagram of the door ejection mechanism of the door opening and closing device in FIG. 1.

Referring to FIG. 13, the door ejection mechanism 300 may be configured as a door ejection profile 380. The door ejection profile 380 may be rotatably disposed on the base 600 via a linkage-member pivot shaft 350. Areas of the door ejection profile 380 may be divided according to functions thereof, that is, a fourth tooth portion 381 for meshing and connecting the drive mechanism 100 is provided. The door ejection profile 380, under the driving of the drive mechanism 100, is driven to rotate. A door ejection portion 382 may be disposed on the door ejection profile 380. The door ejection portion 382, when driven by the drive mechanism 100 to rotate, ejects and pushes the door body 920 until the door body 920 is pushed to open to a opening degree.

In some embodiments, the door ejection profile 380 is a fan-shaped structural member. The door ejection portion 382 is a corner portion of an end of the fan-shaped structural member. The door ejection profile 380, when rotating, ejects and pushes the door body 920 along an arc trajectory. In other embodiments, the door ejection profile 380 may be configured as a shape of a cam, and the first tooth portion 381 and the door ejection portion 382 may be disposed on a rim of the cam. The door ejection profile 380 in a cam shape rotates relative to the base 600 and is driven by the drive mechanism 100 to rotate to smoothly eject and push the door body 920 along an arc trajectory, thereby reducing a severity of impact vibration of the ejection-push operations.

In some embodiments, in order to improve a structural strength, reinforcement ribs 383 may be disposed on a fan-shaped structural member.

Figure 20:
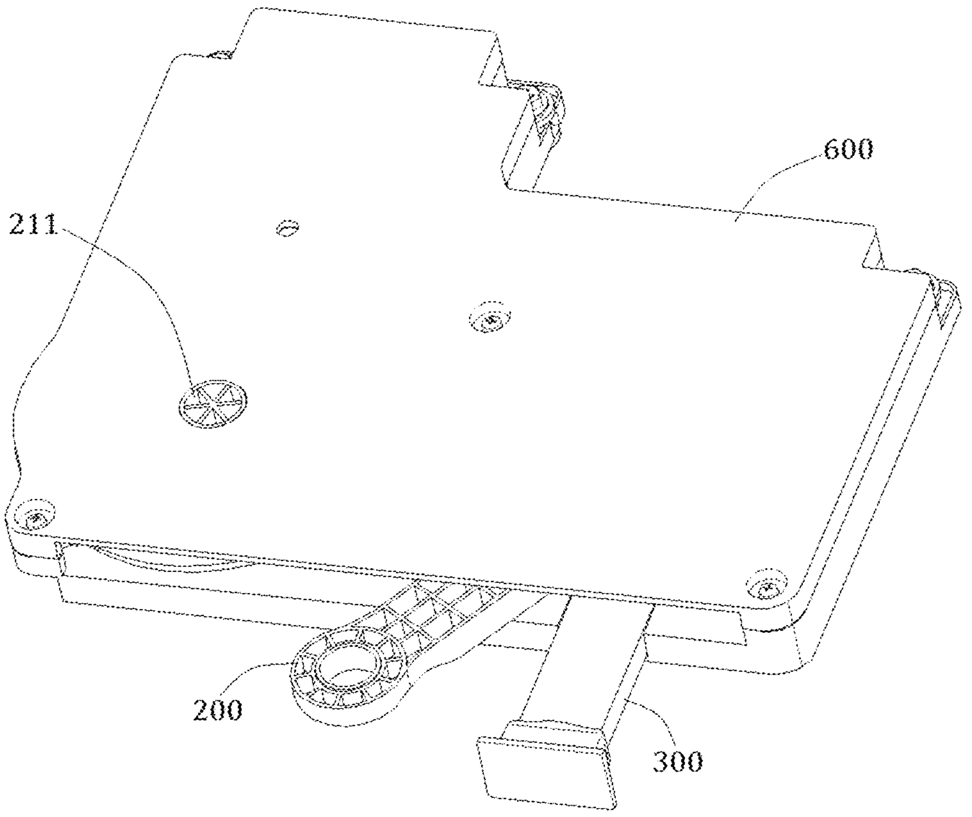
FIG. 20 is a schematic diagram showing an assembly state of the door opening and closing device in FIG. 1.
Figure 21:
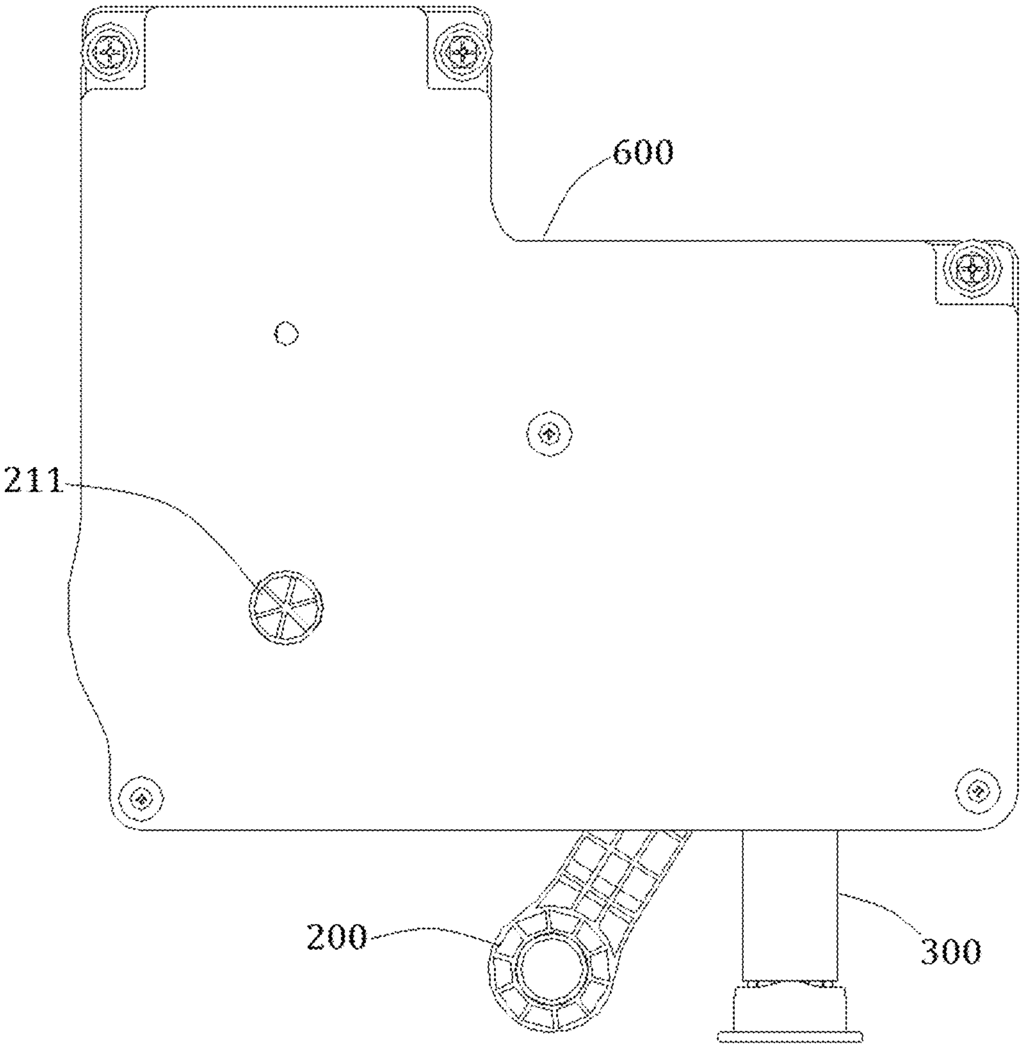
FIG. 21 is a top view of the door opening and closing device in an assembly state in FIG. 1.
Figure 22:
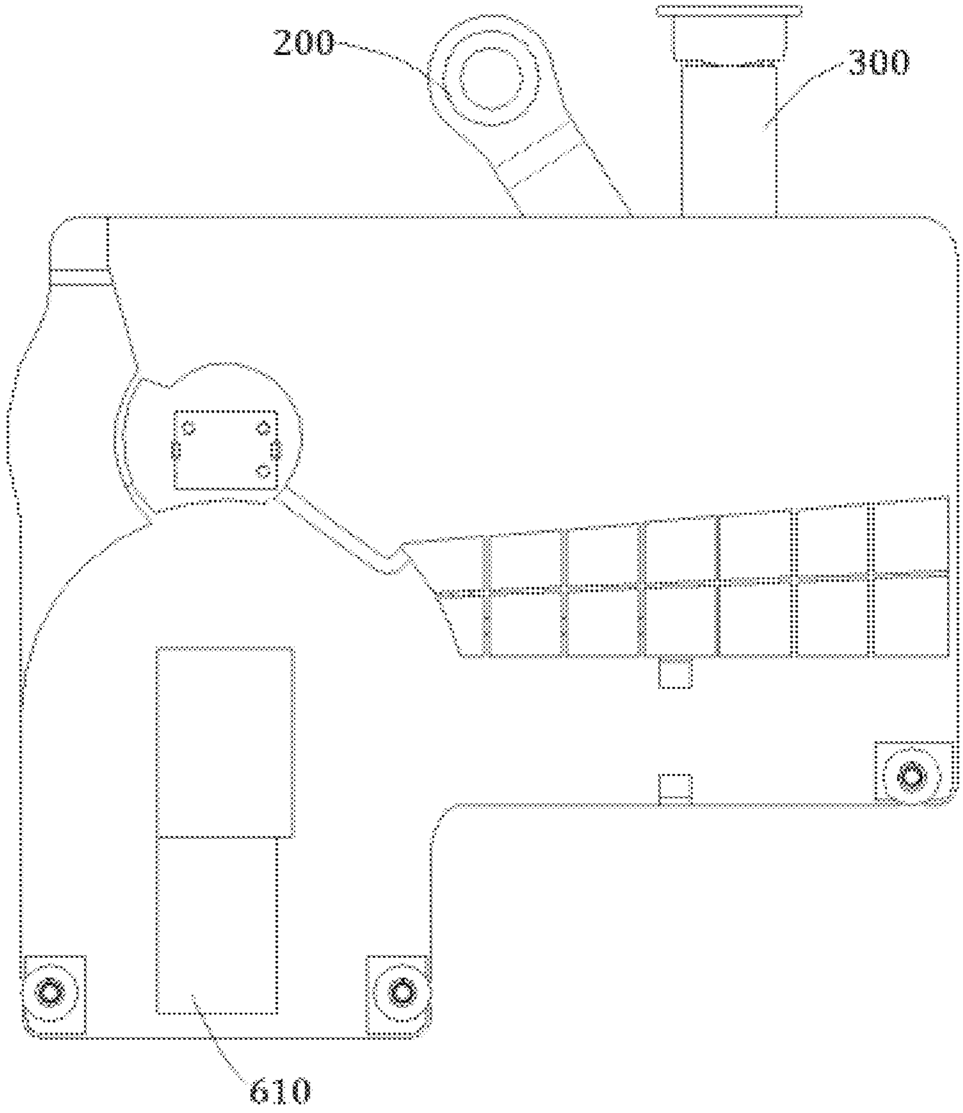
FIG. 22 is a bottom view of the door opening and closing device in the assembly state in FIG. 1.
Figure 23:
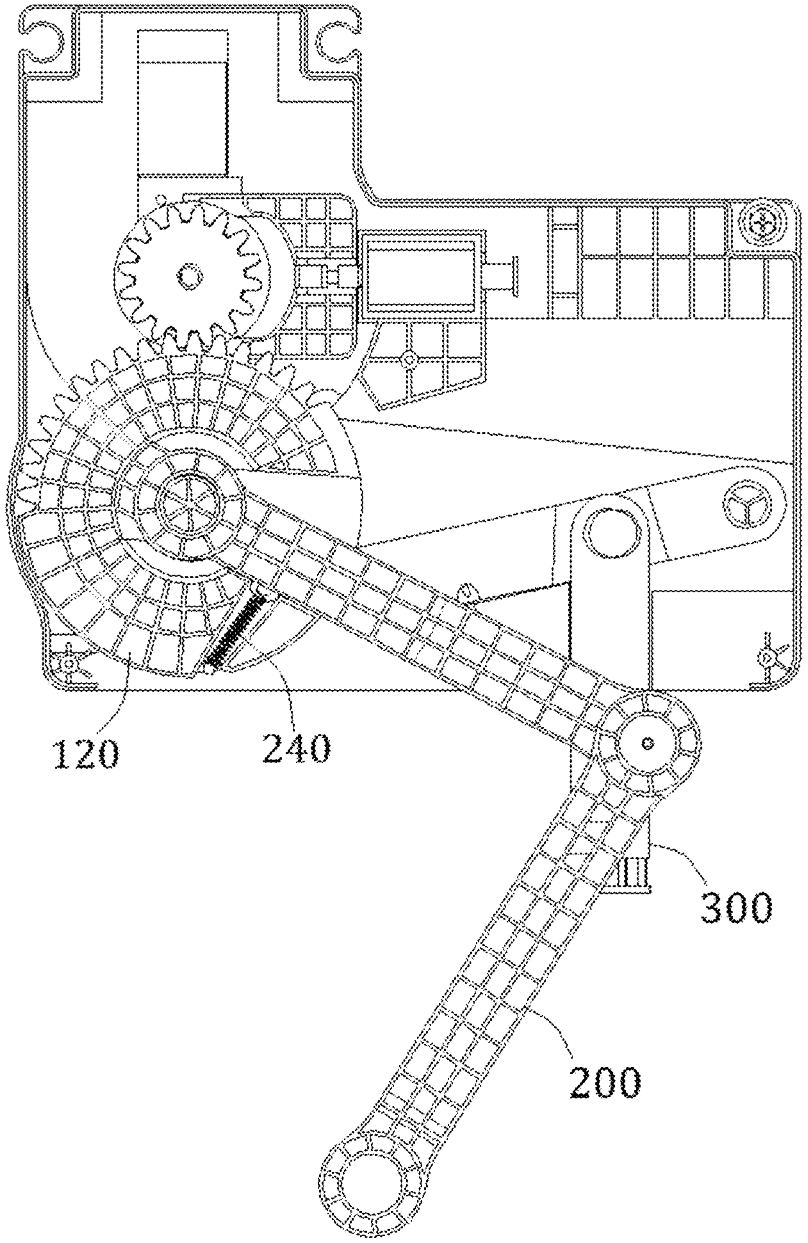
FIG. 23 is a schematic diagram showing a principle of a door closing and returning process of the door opening and closing device in FIG. 1.
Figure 24:
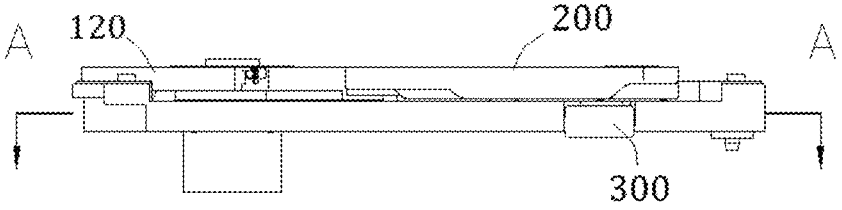
FIG. 24 is a front view of the door opening and closing device in FIG. 1.
Figure 25:
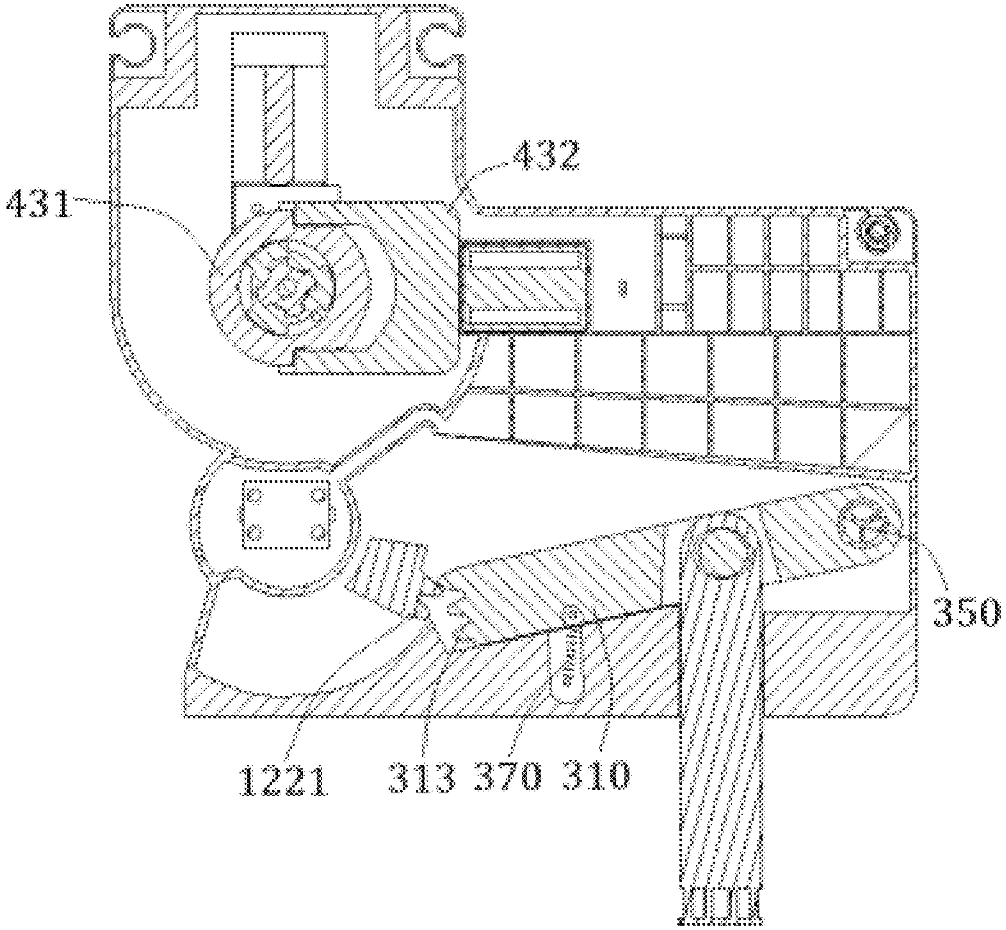
FIG. 25 is a cross-sectional view taken along line A-A in FIG. 24.

Referring to FIG. 20, FIG. 21 and FIG. 22, in some embodiments, the base 600 is configured to be assembled by two independent housings that are matched and snap-fitted together, and fasteners such as fastening screws may be correspondingly provided for locking. A window may be opened in areas where the door ejection member 320 or the door ejection profile 380, the door rotation member 220 and the drive member 210 pass by, to facilitate extensions of the door ejection member 320 or the door ejection profile 380, the door rotation member 220 and the drive member 210, and thus a smooth execution of door opening and closing operations is ensured, while orderly storage can be achieved and an internal functional structure can be protected.

In some embodiments, a shaft reinforcement fixing structure may be configured corresponding to positions of the coaxial rotation shaft 211 and the linkage-member pivot shaft 350 to ensure a reliability of a pivot structure.

In some embodiments, a coaxial rotation-shaft seat 650 is disposed on the base 600 for rotating and fixing the coaxial rotation shaft 211, thereby improving structural stability, fully improving impact resistance, and ensuring that the door rotation mechanism 200 and the linkage gear 20 are stably and reliably coaxially pivoted on the base 600. A driving-motor fix groove 610 for fixing the driver 110 is disposed on the base 600.

Figure 26:
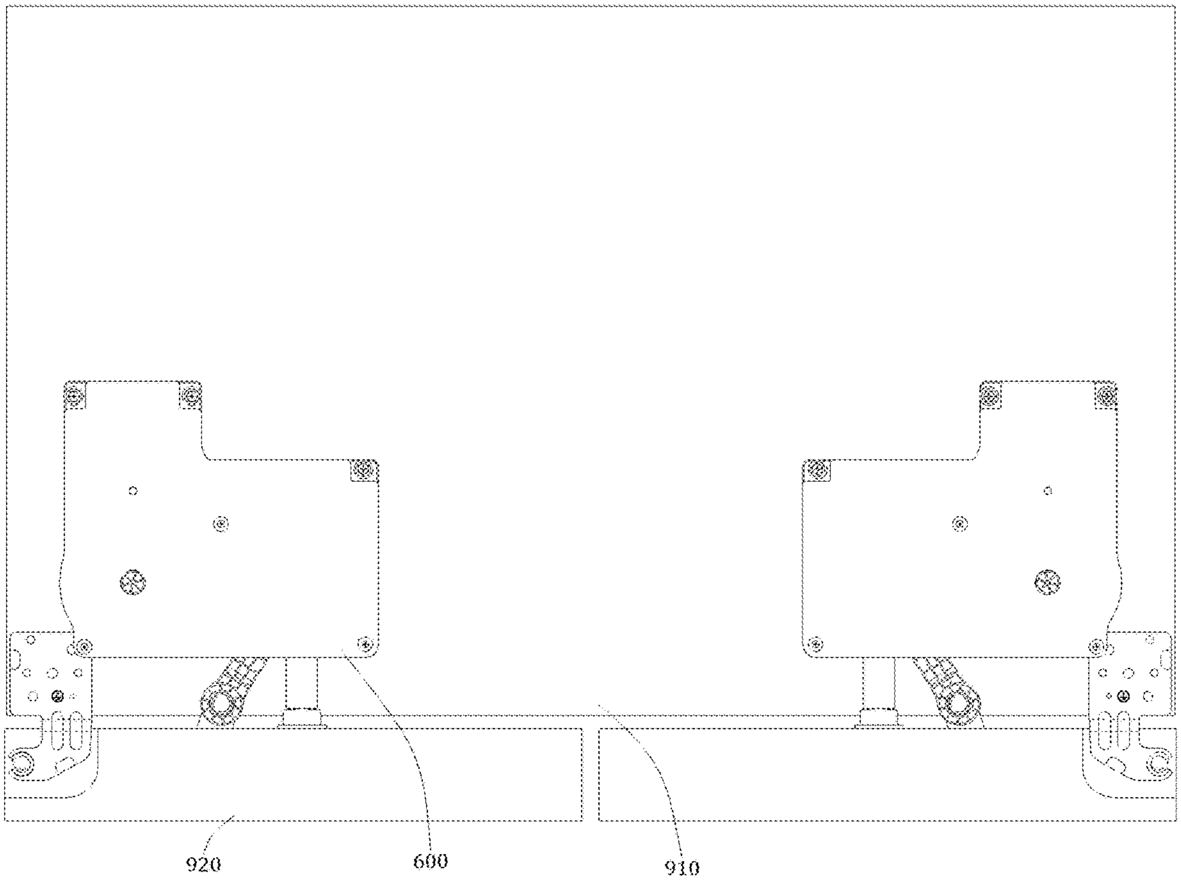
FIG. 26 is a schematic diagram showing an assembly arrangement in a refrigerator of the door opening and closing device in FIG. 1.
Figure 27:
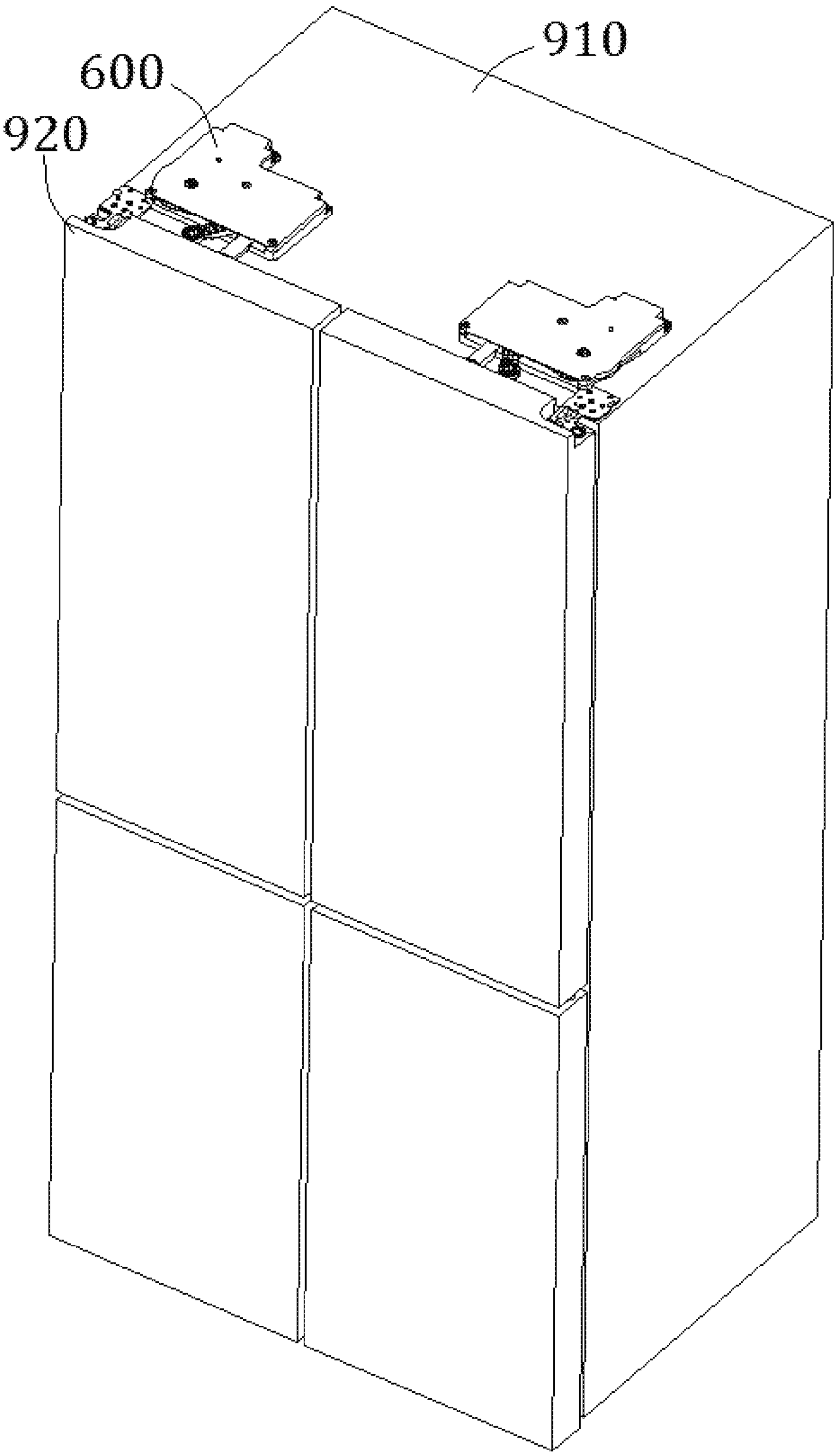
FIG. 27 is an overall schematic diagram of a refrigerator according to an embodiment of the disclosure.

Referring to FIG. 26 and FIG. 27, in some embodiments, a refrigerator is further provided. The refrigerator includes a box body 910 and a door body 920, and the door body 910 is rotatably disposed on the box body 910. A door opening and closing device is connected between the box body 910 and the door body 920 to eject and push or deflect the door body 920 relative to the box body 910, thereby realizing the door opening and closing operations.

In some embodiments, the door opening and closing device is provided with a base 600 which is fixed at the box body 910. The door ejection member 320 or the door ejection profile 380 is directed to or pressed against the door body 920. The door rotation member 220 is hinged on the door body 920 through the hinge seat 230. In other embodiments, the base 600 may be an integrated profile structure formed at a top of the box body 910 to serve as the base. In other embodiments, the door ejection member 320 or the door ejection profile 380 is directed to or is pressed against the box body 910. The door rotation member 220 is hinged to the box body 910 via the hinge seat 230. In some embodiments, the refrigerator may be provided with door bodies 920. An independent door opening and closing device may be provided corresponding to each door body 920, to realize an automatic door opening and closing functionality of the multi-door body refrigerator.

Figure 28:
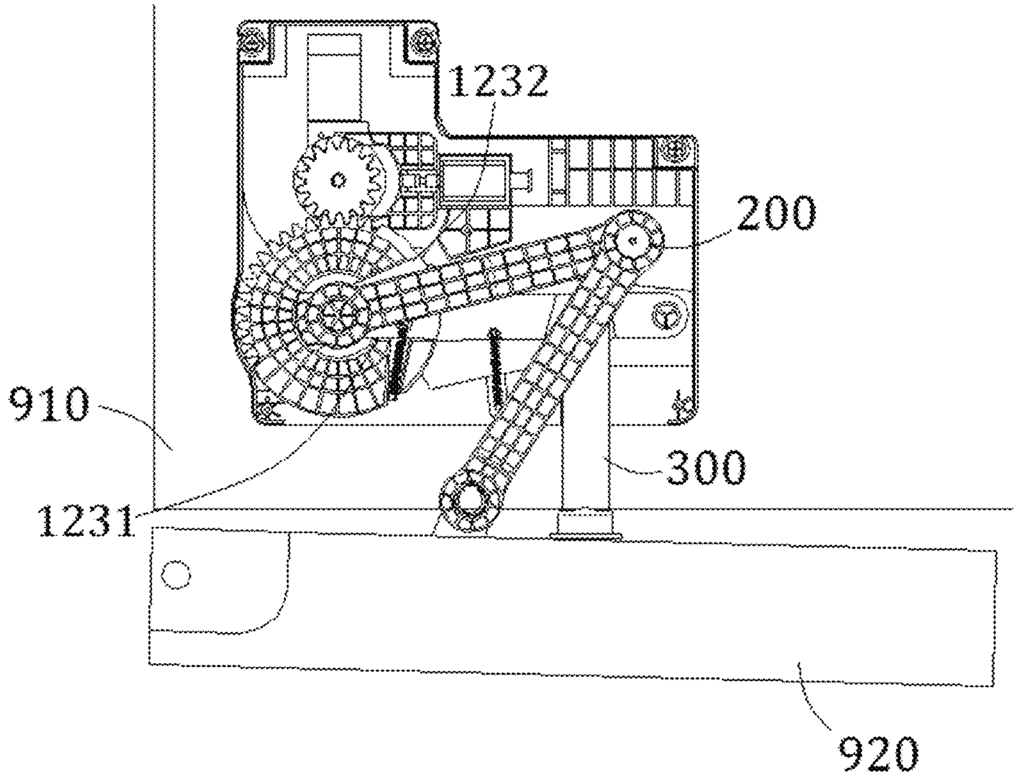
FIG. 28 is a schematic diagram of the door opening and closing device in FIG. 1 in a door ejection state.
Figure 29:
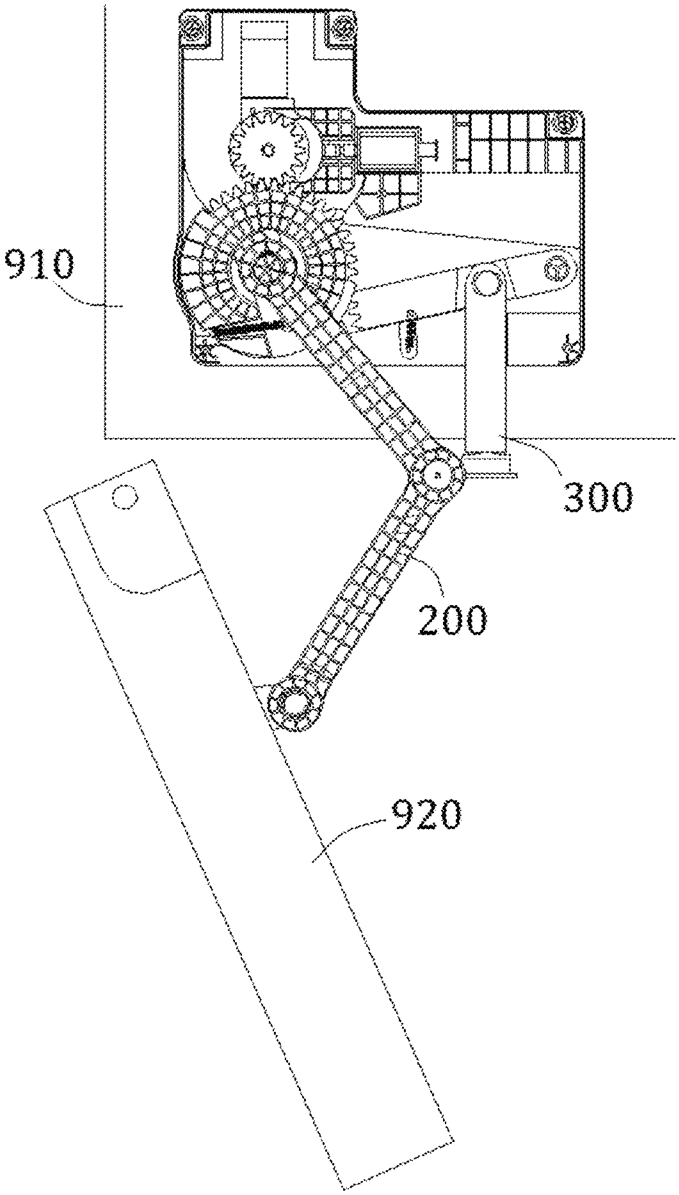
FIG. 29 is a schematic diagram of the door opening and closing device in FIG. 1 in a state of door opening and door rotation.
Figure 30:
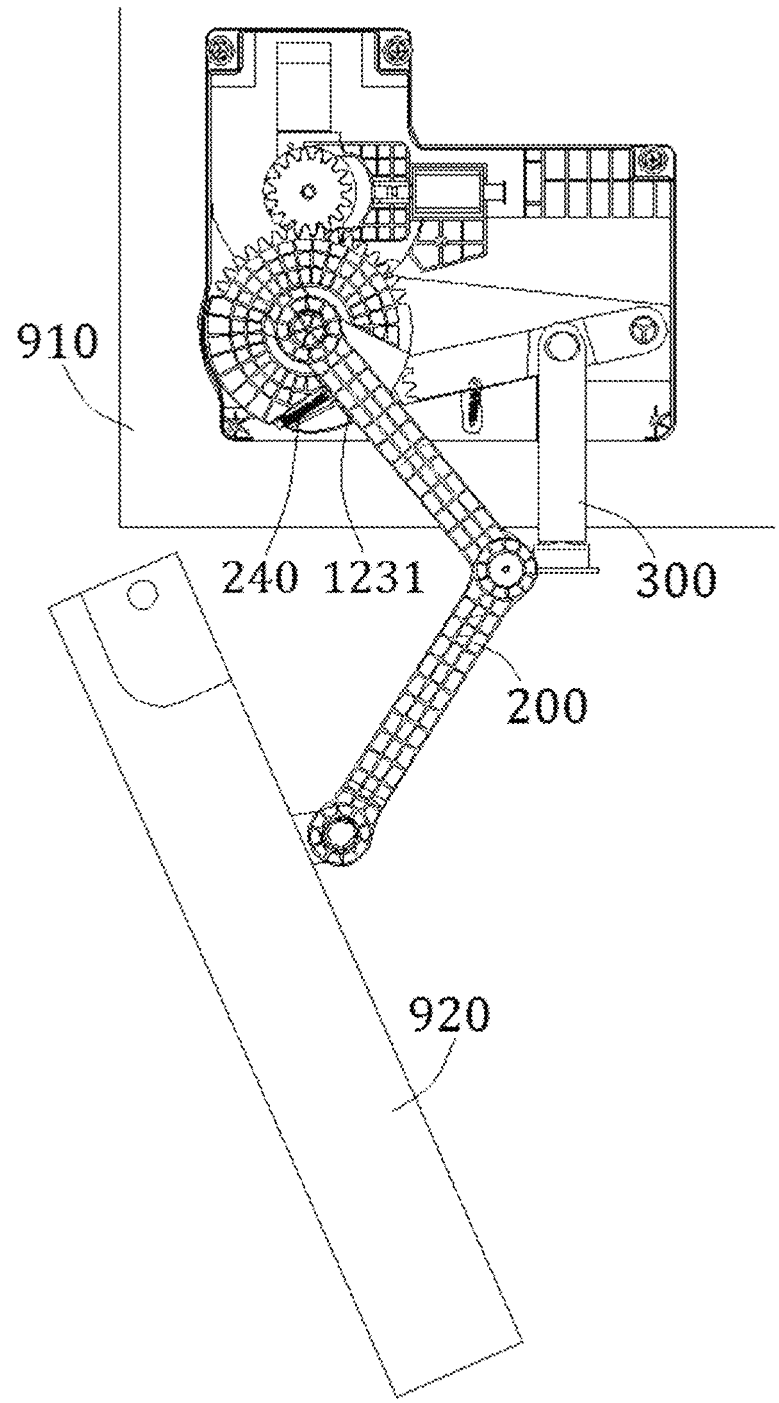
FIG. 30 is a schematic diagram of the door opening and closing device in FIG. 1 in a state of door closing and door rotation.

Referring to FIGS. 28 and 29, when the door opening operation is performed, the linkage gear 120 rotates in a forward direction to drive the door ejection mechanism 300 to directly eject and push the door body 920. After the linkage gear 120 rotates by an angle, an increasing ejection-push force reaches a critical value of breaking through the door opening resistance, and the door body is ejected and pushed to open and is maintained at an angle. As the linkage gear 120 continues to rotate in a forward direction, the first tooth portion 313 and the second tooth portion 1221 are disengaged, and a linkage rod 310 is tightened on the first stop member 630 under an action of the elastic limit member 370. During the above process, the drive member 210 of the door rotation mechanism 200 approaches the second ejection-push portion 1232 from the first ejection-push portion 1231 until the drive member 210 abuts against the second ejection-push portion 1232, and then the second ejection-push portion 1232 can continue to rotate in the forward direction with the linkage gear 120 to eject and push the door body 920 until the door body 920 reaches a set limit position, thereby realizing the door opening operation and the door rotation operation.

Referring to FIGS. 23, 24, 25 and 30, when the door closing operation is performed, the linkage gear 120 rotates in the reverse direction, and the first ejection-push portion 1231, when abutting against the drive member 210, continues to rotate in the reverse direction and eject and push the drive member 210 to rotate in the reverse direction to pull the door rotation member 320 and the door body 920 to rotate toward the box body 910 until the box body 920 is closed to achieve the door closing operation. During the door closing operation, the linkage gear 120 rotates to an angle and is meshed with the first tooth portion 313 through the second tooth portion 1221 to eject and push the linkage member 310 to rotate in the reverse direction until the linkage member 310 reaches an initial position.

With a door opening and closing device and an electrical apparatus according to some embodiments of the disclosure, automatic door-ejection operation and door rotation operation are realized respectively through a door ejection mechanism and a door rotation mechanism driven by a drive mechanism, and thus a convenience and safety of door-opening operation are improved. The door body can be ejected and pushed by the door ejection mechanism, to accumulate force to break through a door opening resistance to eject and open the door to a set angle, thereby greatly reducing a subsequent door-rotation resistance of the door rotation mechanism and increasing an automatic door-opening speed. Furthermore, the first transmission assembly and the second transmission assembly which are separably connected are provided. An active clutching is achieved under the action of the clutch-ejection-push assembly. The second transmission assembly is connected to the driver, and the first transmission assembly is connected to the door ejection mechanism and the door rotation mechanism, thereby enabling a clutching between the drive mechanism and an actuator, thereby effectively avoiding an interference between automatic door opening and closing operations and manual door opening and closing operations. The driver, the door ejection mechanism and the door rotation mechanism can be protected through a flexible and controllable clutch function. The drive member rotatably disposed on the base can serve as a push arm, which is driven by the drive mechanism to eject and push the door body using a lever principle, to greatly improve an ejecting and pushing efficiency in a door-rotation stage. The door rotation member can be rotatably connected to the drive member and the door body, and thus the door rotation member can adapt to a deflection posture change of the linkage member by deflecting relative to the drive member and the door body, and the door rotation member can always be stably hinged on the door body to improve a pushing and pulling effect during a door rotation process. The hinge point A and the rotation center B are respectively located at two sides of a connection line between the hinge point C and the hinge point D, and thus a convex quadrilateral is formed by connecting hinge points A, B, C and D in sequence, thereby avoiding the drive member 210 and the door rotation member 220 from forming a deflection of more than 180 degrees during a rotation process. The deflection of more than 180 degrees may result in an extreme state that there is no force that can be acted on the door rotation member 220, and thus the door rotation member 220 is unable to rotate the door body 920, and a range of opening degree of the door body 920 is also limited and reduced.

Although some embodiments of the disclosure have been described, additional changes and modifications may be made to these embodiments. Therefore, it is intended that the appended claims be interpreted as including the embodiment as well as all changes and modifications that fall within the scope sought for by the disclosure.

Various changes and modifications to the disclosure without departing from the spirit and scope of the disclosure. Thus, if these modifications and variations of the disclosure fall within the scope of the claims of the disclosure and the equivalent technologies thereof, the disclosure is also intended to include these modifications and variations.

The invention claimed is:

1. A door opening and closing device, comprising: a base; a door ejection mechanism and a door rotation mechanism, both are driven by a same drive mechanism, wherein the door ejection mechanism, the door rotation mechanism and the drive mechanism are disposed on the base; wherein the drive mechanism comprises:

a driver;

a first transmission assembly;

a second transmission assembly, connected to the driver and simultaneously separably connected to the first transmission assembly, wherein the second transmission assembly comprises a first transmission member, and wherein the first transmission member comprises a connection end separably connected to the first transmission assembly and an ejection-push end;

a clutch-ejection-push assembly, comprising an ejection-push sleeve is sleeved on the second transmission assembly, and a push rod for pushing the ejection-push sleeve, wherein the ejection-push end is embedded in the ejection-push sleeve, and wherein the ejection-push sleeve is ejected and pushed by the push rod to push the second transmission assembly to separate from or connect to the first transmission assembly; and a linkage gear, rotatably disposed on the base, and connected to the first transmission assembly, the door ejection mechanism and the door rotation mechanism;

wherein the driver is configured to drive the door ejection mechanism and the door rotation mechanism to deflect relative to the base through the linkage gear; and wherein the first transmission assembly is opened with a slot, and the connection end is separably snapped in the slot.

2. The door opening and closing device according to claim 1, wherein internal teeth are disposed on a groove wall surface of the slot; and external teeth are disposed on an outer peripheral surface of the connection end for meshing with the internal teeth.

3. The door opening and closing device according to claim 2, wherein the first transmission assembly is a first transmission gear for meshing with the linkage gear; and the slot is opened at an axial end of the first transmission gear.

4. The door opening and closing device according to claim 1, wherein a plurality of spaced limit bosses are disposed on an outer peripheral surface of the ejection-push end; and the limit bosses slidably abut against an inner surface of the ejection-push sleeve.

5. The door opening and closing device according to claim 1, wherein the first transmission member further comprises a support flange disposed between the connection end and the ejection-push end and is configured for resting on an end surface of the ejection-push sleeve.

6. The door opening and closing device according to claim 1, wherein the second transmission assembly comprises a first transmission member and a second transmission member; and the first transmission assembly is separably connected to the second transmission assembly, and the first transmission member is sleeved on the second transmission member and is rotatable with the second transmission member.

7. The door opening and closing device according to claim 6, wherein the second transmission assembly further comprises a transmission shaft, and wherein the second transmission member and the first transmission assembly are both sleeved on the transmission shaft.

8. The door opening and closing device according to claim 6, wherein an axial through groove is opened on an inner surface of the first transmission member; and an outer surface of the second transmission member is provided with a block thereon, wherein upon the first transmission member is sleeved on the second transmission member, the block is axially slidably embedded in the axial through groove.

9. The door opening and closing device according to claim 1, wherein the ejection-push sleeve ejects and pushes the second transmission assembly along a first direction; the ejection-push sleeve is provided with a first ejection-push surface; the push rod is provided with a second ejection-push surface in contact with the first ejection-push surface; and an angle between the first direction and the first ejection-push surface is an acute angle, wherein two first ejection-push surfaces are disposed on the ejection-push sleeve; the two first ejection-push surfaces are disposed on two opposite sides of the ejection-push sleeve; the push rod comprises two push arms disposed in parallel and a connection portion connecting the two push arms; ends of the two push arms away from the connection portion are provided with second ejection-push surfaces; and two second ejection-push surfaces are in contact with the two first ejection-push surfaces, respectively.

10. The door opening and closing device according to claim 9, wherein the clutch-ejection-push assembly further comprises a linear driver, and wherein the linear driver is connected to the push rod to drive the push rod to eject and push the ejection-push sleeve.

11. The door opening and closing device according to claim 1, wherein the ejection-push sleeve ejects and pushes the second transmission assembly along the first direction;

the ejection-push sleeve is opened with two first ejection-push grooves; the two first ejection-push grooves are disposed on two opposite sides of the ejection-push sleeve; and groove walls of the two first ejection-push grooves are respectively provided with first ejection-push surfaces; and the push rod comprises two push arms disposed in parallel and a connection portion connecting the two push arms; ends of the two push arms away from the connection portion are provided with second ejection-push surfaces; and two second ejection-push surfaces are in contact with the two first ejection-push surfaces, respectively.

12. The door opening and closing device according to claim 11, wherein a side of each push arm of the two push arms away from another push arm is disposed with a limit baffle, and two limit baffles are disposed on two opposite sides of the ejection-push sleeve.

13. The door opening and closing device according to claim 1, wherein the linkage gear further comprises:

a body, rotatably disposed on the base;

a first ejection-push portion, disposed on the body, and pushing, when the body rotates in a forward direction, the door rotation mechanism to rotate so as to open a door body; and a second ejection-push portion, disposed on the body, and pushing, when the body rotates in a reverse direction, the door rotation mechanism to rotate so as to close the door body, wherein the door rotation mechanism rotates between the first ejection-push portion and the second ejection-push portion by a first angle; and the body and the door rotation mechanism are coaxially rotatably disposed on the base, wherein the door ejection mechanism comprises a first tooth portion; the linkage gear further comprises a third ejection-push portion provided with a second tooth portion for meshing with the first gear for transmission; and when the body rotates in the forward direction, the third ejection-push portion drives the door ejection mechanism to push the door body.

14. The door opening and closing device according to claim 13, wherein a rotation limit groove is disposed at the body; the body and the door rotation mechanism are coaxially rotatably disposed on the base; the door rotation mechanism is rotatable in the rotation limit groove; and the first ejection-push portion and the second ejection-push portion are groove walls of the rotation limit groove in a radial direction of the linkage gear.

15. The door opening and closing device according to claim 1, wherein the door rotation mechanism comprises a transmission member and a door rotation member; a first end of the door rotation member is rotatably disposed on a door body; a second end of the door rotation member is rotatably connected to a first end of the transmission member; a second end of the transmission member is rotatably disposed on the base; and the linkage gear drives the transmission member to rotate so as to drive the door rotation member to rotate the door body.

16. The door opening and closing device according to claim 1, wherein the door ejection mechanism comprises:

a linkage member, a first end of rotatably disposed on the base, and a second end of connected to the linkage gear; and a door ejection member, a first end of rotatably connected to the linkage member, and a second end of configured for ejecting and pushing a door body; and wherein, the linkage gear drives a rotation of the linkage member to drive the door ejection member to eject and push the door body, wherein the door ejection mechanism further comprises:

an elastic limit member, being respectively connected to the linkage member and the base to maintain the linkage member at a preset angle, wherein one of the door ejection member and the linkage member is provided with a waist-shaped hole; the other one of the door ejection member and the linkage member is provided with a pin shaft; and the pin shaft is rotatably disposed in the waist-shaped hole.

17. The door opening and closing device according to claim 1, wherein the door ejection mechanism is rotatably disposed on the base, and comprises: a first tooth portion meshing with the linkage gear and a door ejection portion for ejecting and pushing a door body, and wherein the linkage gear drives, by the first tooth portion, the door ejection mechanism to rotate relative to the base, so as to drive the door ejection portion to eject and push the door body, wherein the door ejection mechanism further comprises:

a limit member, disposed on the base, wherein the door ejection mechanism abuts against the limit member upon the door ejection mechanism rotates to a preset angle relative to the base; and a tensioning member, two ends of which are respectively connected to the door ejection mechanism and the base to maintain the door ejection mechanism at the preset angle, wherein the door ejection mechanism is in a shape of a cam; and the first tooth portion and the door ejection portion are located at a rim of the cam.

18. An electrical apparatus, comprising: a box body, a door body rotatably disposed on the box body, and the door opening and closing device according to claim 1, wherein the base is disposed on the box body, wherein the electrical apparatus is one of a refrigerator, a disinfection cabinet, and a dishwasher.

* * * * *